US010148568B2

(12) United States Patent
Xu et al.

(10) Patent No.: US 10,148,568 B2
(45) Date of Patent: Dec. 4, 2018

(54) METHOD FOR PROCESSING HOST ROUTE IN VIRTUAL SUBNET, RELATED DEVICE, AND COMMUNICATIONS SYSTEM

(71) Applicant: Huawei Technologies Co., Ltd., Shenzhen (CN)

(72) Inventors: Xiaohu Xu, Shenzhen (CN); Dacheng Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 99 days.

(21) Appl. No.: 15/242,087

(22) Filed: Aug. 19, 2016

(65) Prior Publication Data

US 2016/0373356 A1 Dec. 22, 2016

Related U.S. Application Data

(63) Continuation of application No. PCT/CN2015/070045, filed on Jan. 4, 2015.

(30) Foreign Application Priority Data

Feb. 21, 2014 (CN) .......................... 2014 1 0060262

(51) Int. Cl.
*H04L 12/28* (2006.01)
*H04L 12/741* (2013.01)
(Continued)

(52) U.S. Cl.
CPC ............ *H04L 45/741* (2013.01); *H04L 45/04* (2013.01); *H04L 45/18* (2013.01); *H04L 45/586* (2013.01); *H04L 45/66* (2013.01); *H04L 45/745* (2013.01)

(58) Field of Classification Search
CPC ..... H04L 45/741; H04L 45/745; H04L 45/66; H04L 45/586; H04L 45/04; H04L 45/18
See application file for complete search history.

(56) References Cited

U.S. PATENT DOCUMENTS 7,260,648 B2 * 8/2007 Tingley et al. ... H04L 29/12009
709/227
2004/0088389 A1 5/2004 Shah
(Continued)

FOREIGN PATENT DOCUMENTS

CN 101072238 A 11/2007
CN 101075933 A * 11/2007
(Continued)

Primary Examiner — Shailendra Kumar
(74) Attorney, Agent, or Firm — Leydig, Voit & Mayer, Ltd.

(57) ABSTRACT

The present disclosure discloses a method for processing a host route in a virtual subnet, a related device and a communications system. The method includes: receiving, by a first provider edge device, a packet for address resolution, where a virtual subnet site in which the first provider edge device is located further includes at least one second provider edge device; determining, by the first provider edge device, whether a source MAC address carried in the packet is a virtual MAC address; and when it is determined that the source MAC address is a virtual MAC address, skipping performing at least one of the following operations: saving a local CE host routing table entry corresponding to a source IP address carried in the packet, or distributing, in the virtual subnet based on a routing protocol of a layer 3 VPN, a local CE host route corresponding to the IP address.

17 Claims, 8 Drawing Sheets

(51) Int. Cl.

| | | |
|---|---|---|
| *H04L 12/713* | (2013.01) | |
| *H04L 12/721* | (2013.01) | |
| *H04L 12/749* | (2013.01) | |
| *H04L 12/705* | (2013.01) | |
| *H04L 12/715* | (2013.01) | |

(56) References Cited

U.S. PATENT DOCUMENTS

| | | | | |
|---|---|---|---|---|
| 2006/0221979 | A1* | 10/2006 | Cheshire | H04L 29/12028 370/395.54 |
| 2007/0192858 | A1* | 8/2007 | Lum | H04L 29/12028 726/22 |
| 2007/0288653 | A1* | 12/2007 | Sargor | H04L 29/12405 709/245 |
| 2008/0232384 | A1 | 9/2008 | Miyabe | |
| 2009/0063706 | A1 | 3/2009 | Goldman et al. | |
| 2010/0272111 | A1* | 10/2010 | Kini | H04L 45/00 370/395.53 |
| 2011/0299537 | A1 | 12/2011 | Saraiya et al. | |
| 2012/0182876 | A1 | 7/2012 | Miyabe | |

FOREIGN PATENT DOCUMENTS

| | | |
|---|---|---|
| CN | 101075933 A | 11/2007 |
| CN | 102164091 A | 8/2011 |
| JP | 2008236212 A | 10/2008 |
| JP | 2012151604 A | 8/2012 |

\* cited by examiner

METHOD FOR PROCESSING HOST ROUTE IN VIRTUAL SUBNET, RELATED DEVICE, AND COMMUNICATIONS SYSTEM

CROSS-REFERENCE TO RELATED APPLICATIONS

This application is a continuation of International Application No. PCT/CN2015/070045, filed on Jan. 4, 2015, which claims priority to Chinese Patent Application No. 201410060262.7, filed on Feb. 21, 2014, both of which are hereby incorporated by reference in their entireties.

TECHNICAL FIELD

The present disclosure relates to the field of communications technologies, and specifically, to a method for processing a local host route in a virtual subnet, a related device and a communications system.

BACKGROUND

A local customer edge (CE) host route is generally exchanged between provider edge (PE) devices in a virtual subnet (VS) by means of a routing protocol of a layer 3 virtual private network (L3VPN), so as to implement subnet extension.

A PE device may generate a local CE host route corresponding to an internet protocol (IP) address of a local CE host according to local CE host information recorded in an address resolution protocol (ARP) or neighbor discovery (ND) protocol cache table, and distribute the local CE host route in a virtual subnet based on a routing protocol of an L3VPN, so that other PE devices in the virtual subnet may learn the local CE host route. In addition, the PE device may have a function of ARP or ND protocol proxy. Taking an application scenario of an ARP as an example, when a PE device in a virtual subnet receives from a local CE host an ARP request packet for querying a MAC address of a remote CE host, if the PE device has learned a CE host route corresponding to an IP address of the remote CE host currently, the PE device may serve as a Proxy to return a virtual media access address (VMAC) corresponding to the PE device to a requesting local CE host through an ARP response packet.

Multiple sites exist in a virtual subnet. It is found by practice that, in a case in which multiple PE devices exist in some sites of the virtual subnet to implement multi-home of a site, it is usually easy to form a CE host routing loop. Moreover, after the CE host routing loop is formed, a forwarding path length of a data packet may generally have a relatively large increase, thereby possibly greatly affecting efficiency of data packet transmission between CE hosts.

SUMMARY

Embodiments of the present disclosure provide a method for processing a host route in a virtual subnet, a related device and a communications system, so as to avoid forming a CE host routing loop to a greatest extent in a scenario in which multiple PE devices exist in some sites of the virtual subnet, thereby improving efficiency of data packet transmission between CE hosts.

To solve the above-mentioned technical problem, the embodiments of the present disclosure provides the following technical solutions:

A first aspect of the embodiments of the present disclosure provides a method for processing a host route in a virtual subnet, including:
receiving, by a first provider edge device, a packet for address resolution, where a virtual subnet site in which the first provider edge device is located further includes at least one second provider edge device;
determining, by the first provider edge device, whether a source media access control MAC address carried in the packet is a virtual MAC address; and
when it is determined that the source MAC address is a virtual MAC address, skipping performing at least one of the following operations: saving a local customer edge CE host routing table entry corresponding to a source internet protocol IP address carried in the packet, or distributing, in the virtual subnet based on a routing protocol of a layer 3 virtual private network VPN, a local CE host route corresponding to the IP address.

With reference to the first aspect, in a first possible implementation manner of the first aspect,
the method further includes:
when it is determined that the source MAC address is not a virtual MAC address, performing at least one of the following operations: saving a local CE host routing table entry corresponding to the source IP address, or distributing, in the virtual subnet based on the routing protocol, a local CE host route corresponding to the IP address.

With reference to the first aspect, in a second possible implementation manner of the first aspect,
the method further includes:
when it is determined that the source MAC address is not a virtual MAC address and the source MAC address is different from any one of MAC addresses recorded in a whitelist, skipping performing at least one of the following operations: saving a local CE host routing table entry corresponding to the source IP address, or distributing, in the virtual subnet based on the routing protocol, a local CE host route corresponding to the IP address;
and/or
when it is determined that the source MAC address is not a virtual MAC address and the source MAC address is the same as one of MAC addresses recorded in the whitelist, performing at least one of the following operations: saving a local CE host routing table entry corresponding to the source IP address, or distributing, in the virtual subnet based on the routing protocol, a local CE host route corresponding to the IP address.

With reference to the first aspect, in a third possible implementation manner of the first aspect,
the method further includes:
when it is determined that the source MAC address is not a virtual MAC address and the source MAC address is different from any one of MAC addresses recorded in a blacklist, performing at least one of the following operations: saving a local CE host routing table entry corresponding to the source IP address, or distributing, in the virtual subnet based on the routing protocol, a local CE host route corresponding to the IP address;
and/or
when it is determined that the source MAC address is not a virtual MAC address and the source MAC address is the same as one of MAC addresses recorded in the blacklist, skipping performing at least one of the following operations: saving a local CE host routing table entry corresponding to the source IP address, or distributing, in the virtual subnet based on the routing protocol, a local CE host route corresponding to the IP address.

With reference to the first aspect or the first possible implementation manner of the first aspect or the second possible implementation manner of the first aspect or the third possible implementation manner of the first aspect, in a fourth possible implementation manner of the first aspect, the determining whether a source media access control MAC address carried in the packet is a virtual MAC address includes: determining that the source MAC address is a virtual MAC address if the source MAC address carried in the packet is the same as a virtual MAC address corresponding to the first provider edge device; and determining that the source MAC address is not a virtual MAC address if the source MAC address is different from the virtual MAC address corresponding to the first provider edge device.

With reference to the fourth possible implementation manner of the first aspect, in a fifth possible implementation manner of the first aspect, the virtual MAC address corresponding to the first provider edge device is specifically a virtual MAC address corresponding to a virtual router that is associated with the first provider edge device.

With reference to the first aspect or the first possible implementation manner of the first aspect or the second possible implementation manner of the first aspect or the third possible implementation manner of the first aspect, in a sixth possible implementation manner of the first aspect, the determining whether a source media access control MAC address carried in the packet is a virtual MAC address includes:

querying a virtual MAC address corresponding to the at least one second provider edge device, and determining that the source MAC address is a virtual MAC address if the source MAC address carried in the packet is the same as a queried virtual MAC address corresponding to one of the at least one second provider edge device; and determining that the source MAC address is not a virtual MAC address if the source MAC address carried in the packet is different from the queried virtual MAC address corresponding to any one of the at least one second provider edge device.

With reference to the sixth possible implementation manner of the first aspect, in a seventh possible implementation manner of the first aspect, the virtual MAC address corresponding to the second provider edge device is specifically a virtual MAC address corresponding to a virtual router that is associated with the second provider edge device.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect, in an eighth possible implementation manner of the first aspect, the packet is an address resolution protocol ARP packet or a neighbor discovery ND protocol packet.

A second aspect of the embodiments of the present disclosure provides a provider edge device, which may include:

a receiving unit, configured to receive a packet for address resolution, where a virtual subnet site in which the provider edge device is located further includes at least one second provider edge device; and a processing unit, configured to: determine whether a source media access control MAC address carried in the packet is a virtual MAC address; and when it is determined that the source MAC address is a virtual MAC address, skip performing at least one of the following operations: saving a local customer edge CE host routing table entry corresponding to a source internet protocol IP address carried in the packet, or distributing, in the virtual subnet based on a routing protocol of a layer 3 virtual private network VPN, a local CE host route corresponding to the IP address.

With reference to the second aspect, in a first possible implementation manner of the second aspect, the processing unit is further configured to: when it is determined that the source MAC address is not a virtual MAC address, perform at least one of the following operations: saving a local CE host routing table entry corresponding to the source IP address, or distributing, in the virtual subnet based on the routing protocol, a local CE host route corresponding to the IP address.

With reference to the second aspect, in a second possible implementation manner of the second aspect, the processing unit is further configured to:

when it is determined that the source MAC address is not a virtual MAC address and the source MAC address is different from any one of MAC addresses recorded in a whitelist, skip performing at least one of the following operations: saving a local CE host routing table entry corresponding to the source IP address, or distributing, in the virtual subnet based on the routing protocol, a local CE host route corresponding to the IP address;

and/or when it is determined that the source MAC address is not a virtual MAC address and the source MAC address is the same as one of MAC addresses recorded in the whitelist, perform at least one of the following operations: saving a local CE host routing table entry corresponding to the source IP address, or distributing, in the virtual subnet based on the routing protocol, a local CE host route corresponding to the IP address.

With reference to the second aspect, in a third possible implementation manner of the second aspect, the processing unit is further configured to:

when it is determined that the source MAC address is not a virtual MAC address and the source MAC address is different from any one of MAC addresses recorded in a blacklist, perform at least one of the following operations: saving a local CE host routing table entry corresponding to the source IP address, or distributing, in the virtual subnet based on the routing protocol, a local CE host route corresponding to the IP address;

and/or when it is determined that the source MAC address is not a virtual MAC address and the source MAC address is the same as one of MAC addresses recorded in the blacklist, skip performing at least one of the following operations: saving a local CE host routing table entry corresponding to the source IP address, or distributing, in the virtual subnet based on the routing protocol, a local CE host route corresponding to the IP address.

With reference to the second aspect or the first possible implementation manner of the second aspect or the second possible implementation manner of the second aspect or the third possible implementation manner of the second aspect, in a fourth possible implementation manner of the second aspect, in an aspect of the determining whether a source media access control MAC address carried in the packet is a virtual MAC address, the processing unit is specifically configured to: determine that the source MAC address is a virtual MAC address if the source MAC address carried in the packet is the same as a virtual MAC address corresponding to the provider edge device; and determine that the source MAC address is not a virtual MAC address if the source MAC address is different from the virtual MAC address corresponding to the provider edge device.

With reference to the fourth possible implementation manner of the second aspect, in a fifth possible implementation manner of the second aspect, the virtual MAC address corresponding to the provider edge device is specifically a virtual MAC address corresponding to a virtual router that is associated with the provider edge device.

With reference to the second aspect or the first possible implementation manner of the second aspect or the second possible implementation manner of the second aspect or the third possible implementation manner of the second aspect, in a sixth possible implementation manner of the second aspect, in an aspect of the determining whether a source media access control MAC address carried in the packet is a virtual MAC address, the processing unit is specifically configured to: query a virtual MAC address corresponding to the at least one second provider edge device, and determine that the source MAC address is a virtual MAC address if the source MAC address carried in the packet is the same as a queried virtual MAC address corresponding to one of the at least one second provider edge device; and determine that the source MAC address is not a virtual MAC address if the source MAC address carried in the packet is different from the queried virtual MAC address corresponding to any one of the at least one second provider edge device.

With reference to the sixth possible implementation manner of the second aspect, in a seventh possible implementation manner of the second aspect, the virtual MAC address corresponding to the second provider edge device is specifically a virtual MAC address corresponding to a virtual router that is associated with the second provider edge device.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect or the sixth possible implementation manner of the second aspect or the seventh possible implementation manner of the second aspect, in an eighth possible implementation manner of the second aspect, the packet is an address resolution protocol ARP packet or a neighbor discovery ND protocol packet.

A third aspect of an embodiment of the present disclosure provides a communications system, which may include:

multiple provider edge devices, where at least one of the multiple provider edge devices is any one of the provider edge devices provided in the embodiments of the present disclosure.

It can be seen from the above, in the technical solutions of the embodiments of the present disclosure, after receiving a packet for address resolution, a first PE device first determines whether a source MAC address carried in the packet for address resolution is a virtual MAC address; and when it is determined that the source MAC address is a virtual MAC address, a local CE host routing table entry corresponding to a source IP address carried in the above-mentioned ARP packet is not saved, and/or a local CE host route corresponding to the above-mentioned IP address is not distributed in the above-mentioned virtual subnet based on a routing protocol of a layer 3 VPN, and the virtual subnet site in which the first PE device is located further includes at least one second PE device. A research finds that the packet, whose source MAC address is a virtual MAC, for address resolution is generally sent by another PE device that is in the virtual subnet site in which the first PE device is located and that serves as an address resolution proxy. Therefore, the first PE device identifies and determines whether the source MAC address carried in the received packet for address resolution is a virtual MAC address, so as to identify a case whether the packet for address resolution is sent by the another PE device that is in the virtual subnet site in which the first PE device is located and that serves as an address resolution proxy, and corresponding to such case (that is, when it is determined that the above-mentioned source MAC address is a virtual MAC address), the first PE device does not save a local CE host routing table entry corresponding to a source IP address carried in the above-mentioned packet for address resolution, and/or does not distribute a local CE host route corresponding to the above-mentioned IP address in the above-mentioned virtual subnet based on a routing protocol of a layer 3 VPN. In this way, it is helpful to eliminate that a PE device stores and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

The embodiments of the present disclosure provide a method for processing a host route in a virtual subnet, a related device and a communications system, so as to avoid forming a CE host routing loop to a greatest extent in a scenario in which multiple PE devices exist in some sites of the virtual subnet, thereby improving efficiency of data packet transmission between CE hosts.

To make disclosure objectives, features and advantages of the embodiments of the present disclosure more obvious and easier to understand, a clear and complete description of technical solutions of the embodiments of the present disclosure will be given below, in combination with the accompanying drawings in the embodiments of the present disclosure. Apparently, the embodiments described below are merely a part, but not all, of the embodiments of the present disclosure. All of other embodiments, obtained by those skilled in the art based on the embodiments of the present disclosure without any inventive efforts, fall into the protection scope of the present disclosure.

Terms "first", "second", "third" and "fourth" and the like in the description, claims and the above-mentioned accompanying drawings are used only to distinguish different objects, but not to describe a specific sequence. Furthermore, terms "include", "have" and any other variations thereof are intended to cover a non-exclusive inclusion. For example, a process, a method, a system, a product or a device including a series of steps or units is not limited to the listed steps or units, but may include steps or units which are not listed.

A detailed description will be given below respectively.

Figure 1:
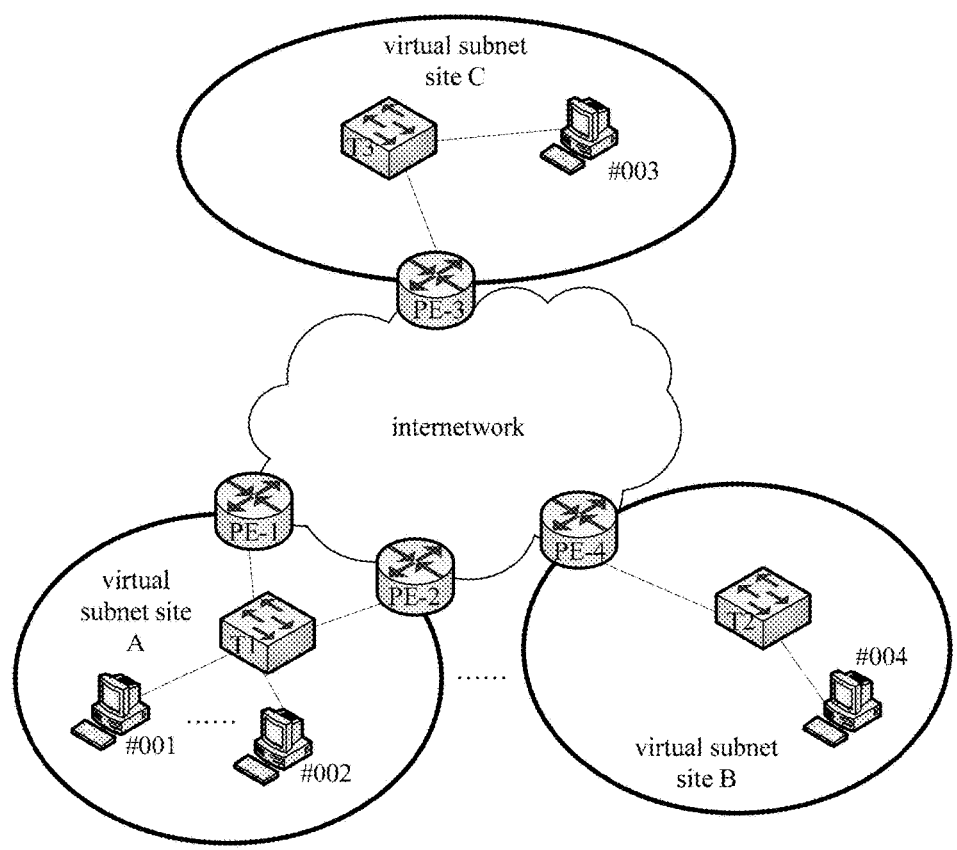
FIG. 1 is a schematic diagram of a network architecture provided in an embodiment of the present disclosure.

Some possible application scenarios involved in the technical solutions of the embodiments of the present disclosure are taken as an example for illustration below with reference to FIG. 1 first. FIG. 1 is a schematic diagram of a network architecture provided in an embodiment of the present disclosure.

As shown in FIG. 1, for example, a virtual subnet site A includes a PE device PE-1, a PE device PE-2, a switching device T1, a CE host #001, and a CE host #002, where the CE host #001 and the CE host #002 are interconnected with the PE device PE-1 and the PE device PE-2 through the switching device T1. A virtual subnet site B includes a PE device PE-4, a switching device T2, and a CE host #004, where the CE host #004 is interconnected with the PE device PE-4 through the switching device T2. A virtual subnet site C includes a PE device PE-3, a switching device T3, and a CE host #003, where the CE host #003 is interconnected with the PE device PE-3 through the switching device T3.

The PE device PE-1, the PE device PE-2, the PE device PE-3, and the PE device PE-4 are interconnected through an internetwork.

A switching device may be a switch, a hub or the like.

Based on an architecture shown in FIG. 1, a scenario of forming a host routing loop analyzed and researched by inventors of the present disclosure is introduced below. An ARP scenario is mainly taken as an example below for illustration and an ND protocol scenario may be performed in a same manner.

It is assumed that the PE-1 has an ARP Proxy function. The PE-1 has learned (for example, from the PE-4) a CE host route corresponding to an IP address of the CE host #004. When the PE-1 receives an ARP request packet from the local CE host #001 for querying a MAC address of the remote CE host #004, since the PE-1 has learned the CE host route corresponding to the IP address of the CE host #004, the PE device may serve as an ARP Proxy to send an ARP response packet for responding to the above-mentioned ARP request packet, so as to return, to the CE host #001 through the ARP response packet, a VMAC address corresponding to a virtual router that is associated with the PE-1 (where VMAC corresponding to the PE-1 is taken as a source MAC address of the above-mentioned ARP response packet). If the switching device T1 floods the received ARP response packet, the PE-2 may receive the above-mentioned ARP response packet. In the prior art, the PE-2 directly saves a local CE host routing table entry corresponding to a source IP address (the source IP address herein is the IP address of the CE host #004) carried in the above-mentioned ARP response packet in a CE host routing table entry (that is, the PE-2 defaults the CE host #004 to a local CE host in the virtual subnet site A incorrectly). The PE-2 may further distribute a local CE host route corresponding to the above-mentioned source IP address in a virtual subnet based on a routing protocol of a layer 3 VPN, and a behavior that the PE-2 distributes the above-mentioned local CE host route in the virtual subnet may enable other PE devices (for example, the PE-3, a PE-5) to learn an incorrect CE host route.

A series of incorrect behaviors of the PE-2 result in forming of a CE host routing loop, for example, the PE-3 (assuming that the PE-3 has learned the above-mentioned incorrect CE host route) may forward a data packet that is sent from the CE host #003 to the CE host #004 to the PE-2, and the PE-2 may forward the data packet to the switching device T1 (since the PE-2 saves an incorrect local CE host routing table entry), the switching device T1 forwards the data packet to the PE-1, and then the PE-1 forwards the data packet to the PE-4, the PE-4 forwards the data packet to the CE host #004 finally, and the data packet arrives at the CE host #004 after several hops. An optimal path of the data packet is generally that it is directly routed to the PE-4 through the PE-3 (without needing to pass the PE-1 and the PE-2), and then it arrives at the CE host #004 rapidly. It can be seen that a routing path length of a data packet may have a larger increase after a CE host routing loop is formed, and so that efficiency of data packet transmission between CE hosts is greatly influenced.

A technical solution of the embodiment of the present disclosure focuses on, in a scenario in which multiple PE devices exist in some nodes of a virtual subnet, how to avoid forming a CE host routing loop and shorten a forwarding path length of data packet transmission between CE hosts to a greatest extent, thereby improving efficiency of data packet transmission between CE hosts.

In an embodiment of a method for processing a host route in a virtual subnet in the present disclosure, the method for processing the host route in the virtual subnet may include: a first PE device receives a packet for address resolution, where a virtual subnet site in which the first PE device is located further includes at least one second PE device; the first PE device determines whether a source media access control MAC address carried in the packet is a virtual MAC address; and when it is determined that the source MAC address is a virtual MAC address, the first PE device skips performing at least one of the following operations: saving a local CE host routing table entry corresponding to a source internet protocol IP address carried in the packet, or distributing, in the virtual subnet based on a routing protocol of a layer 3 virtual private network VPN, a local CE host route corresponding to the IP address.

Figure 2:
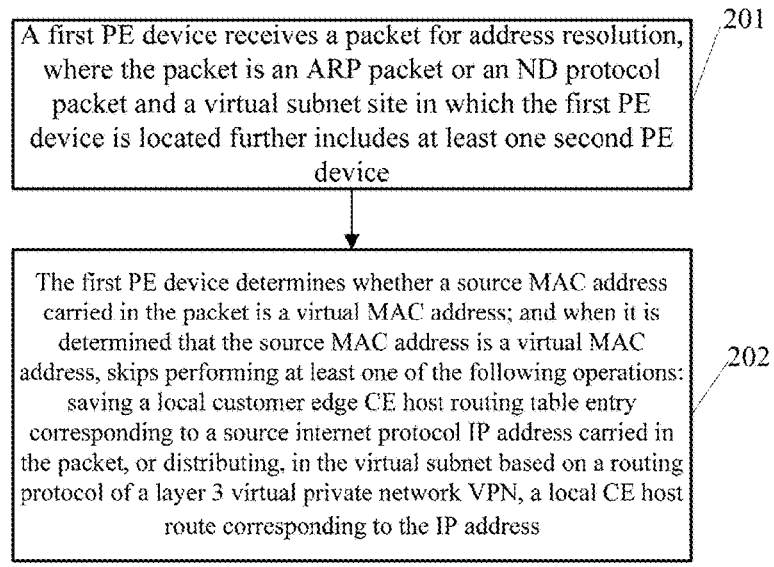
FIG. 2 is a schematic flowchart of a method for processing a host route in a virtual subnet provided in an embodiment of the present disclosure.

Referring to FIG. 2, FIG. 2 is a schematic flowchart of a method for processing a host route in a virtual subnet provided in an embodiment of the present disclosure. The method for processing the host route in the virtual subnet provided in the embodiment of the present disclosure may include the following contents:

201. A first PE device receives a packet for address resolution, where a virtual subnet site in which the first PE device is located further includes at least one second PE device.

It may be understood that the packet for address resolution received by the first PE device may be from a second PE device, and may also be from a CE device in the virtual subnet site in which the first PE device is located.

The packet for address resolution may be an ARP packet or an ND protocol packet or other packets for address resolution.

202. The first PE device determines whether a source MAC address carried in the packet is a virtual MAC address; and when it is determined that the source MAC address is a virtual MAC address, skips performing at least one of the following operations: saving a local customer edge CE host routing table entry corresponding to a source internet protocol IP address carried in the packet, or distributing, in the virtual subnet based on a routing protocol of a layer 3 virtual private network VPN, a local CE host route corresponding to the IP address.

In some embodiments of the present disclosure, the above-mentioned ARP packet may be an ARP request packet or an ARP response packet. The above-mentioned ND protocol packet may be a neighbor solicitation (NS) packet or a neighbor advertisement (NA) packet.

Moreover, when it is determined that the above-mentioned source MAC address is a virtual MAC address, the first PE device may not save an ARP entry or an ND protocol entry, where a mapping relationship between a source IP address and a source MAC address carried in the above-mentioned ARP packet is recorded in the ARP entry. A mapping relationship between a source IP address and a source MAC address carried in the above-mentioned ND protocol packet is recorded in the ND protocol entry.

It can be seen from the above, in the technical solution of the embodiment of the present disclosure, after receiving a packet for address resolution, the first PE device first determines whether a source MAC address carried in the packet for address resolution is a virtual MAC address; and when it is determined that the source MAC address is a virtual MAC address, a local CE host routing table entry corresponding to a source IP address carried in the above-mentioned ARP packet is not saved, and/or a local CE host route corresponding to the above-mentioned IP address is not distributed in the above-mentioned virtual subnet based on a routing protocol of a layer 3 VPN, and the virtual subnet site in which the first PE device is located further includes at least one second PE device. A research finds that the packet, whose source MAC address is a virtual MAC, for address resolution is generally sent by another PE device that is in the virtual subnet site in which the first PE device is located and that serves as an address resolution proxy. Therefore, the first PE device identifies and determines whether the source MAC address carried in the received packet for address resolution is a virtual MAC address, so as to identify a case whether the packet for address resolution is sent by the another PE device that is in the virtual subnet site in which the first PE device is located and that serves as an address resolution proxy, and corresponding to such case (that is, when it is determined that the above-mentioned source MAC address is a virtual MAC address), the first PE device does not save a local CE host routing table entry corresponding to a source IP address carried in the above-mentioned packet for address resolution, and/or does not distribute a local CE host route corresponding to the above-mentioned IP address in the above-mentioned virtual subnet based on a routing protocol of a layer 3 VPN. In this way, it is helpful to eliminate that a PE device stores and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

In some embodiments of the present disclosure, a virtual MAC address corresponding to a PE device (for example, the first PE device or the second PE device) may specifically be a virtual MAC address corresponding to a virtual router that is associated with the PE device.

It can be understood that, a local CE host routing table entry saved by the PE device points to a CE host in a site in which the PE device is located. A local CE host route distributed by the PE device points to a CE host in a site in which the PE device is located. In the embodiment of the present disclosure, the local CE host routing table entry saved by the PE device may include an IP address of a CE host and a next hop address. In the embodiment of the present disclosure, the local CE host route distributed by the PE device may include an IP address of a CE host and a next hop address.

In some embodiments of the present disclosure, the method for processing the host route in the virtual subnet may further include: when it is determined that the source MAC address is not a virtual MAC address, the above-mentioned first PE device may perform at least one of the following operations: saving a local CE host routing table entry corresponding to the source IP address, or distributing, in the virtual subnet based on the routing protocol, a local CE host route corresponding to the IP address of a layer 3 VPN.

In some other embodiments of the present disclosure, the method for processing the host route in the virtual subnet may further include: when it is determined that the source MAC address is not a virtual MAC address and the source MAC address is different from any one of MAC addresses recorded in a whitelist, the above-mentioned first PE device may skip performing at least one of the following operations: saving a local CE host routing table entry corresponding to the source IP address, or distributing, in the virtual subnet based on the routing protocol, a local CE host route corresponding to the IP address of a layer 3 VPN; and/or when it is determined that the source MAC address is not a virtual MAC address and the source MAC address is the same as one of MAC addresses recorded in the whitelist, the above-mentioned first PE device may perform at least one of the following operations: saving a local CE host routing table entry corresponding to the source IP address, or distributing, in the virtual subnet based on the routing protocol, a local CE host route corresponding to the IP address of a layer 3 VPN.

It can be understood that, since a whitelist control mechanism is further introduced, it is helpful to implement route distribution control more flexibly. Further, the above-mentioned first PE device may also update the whitelist according to an instruction.

In still some other embodiments of the present disclosure, the method for processing the host route in the virtual subnet may further include: when it is determined that the source MAC address is not a virtual MAC address and the source MAC address is different from any one of MAC addresses recorded in a blacklist, the above-mentioned first PE device may perform at least one of the following operations: saving a local CE host routing table entry corresponding to the source IP address, or distributing, in the virtual subnet based on the routing protocol, a local CE host route corresponding to the IP address; and/or when it is determined that the source MAC address is not a virtual MAC address and the source MAC address is the same as one of MAC addresses recorded in the blacklist, the above-mentioned first PE device may skip performing at least one of the following operations: saving a local CE host routing table entry corresponding to the source IP address, or distributing, in the virtual subnet based on the routing protocol, a local CE host route corresponding to the IP address.

It can be understood that, since a blacklist control mechanism is further introduced, it is helpful to implement route distribution control more flexibly. Further, the above-mentioned first PE device may also update the blacklist according to an instruction.

In some embodiments of the present disclosure, the determining whether a source media access control MAC address carried in the packet is a virtual MAC address may include: determining that the source MAC address is a virtual MAC address if the source MAC address carried in the packet is the same as a virtual MAC address corresponding to the first PE device; determining that the source MAC address is not a virtual MAC address if the source MAC address is different from the virtual MAC address corresponding to the first PE device. In such example scenario, it is mainly taken as an example for illustration that PE devices in a same virtual subnet site are assumed to correspond to a same virtual MAC address (that is, PE devices in the same virtual subnet site are associated with a same virtual router).

In some other embodiments of the present disclosure, the determining whether a source media access control MAC address carried in the packet is a virtual MAC address may include: the above-mentioned first PE device queries a virtual MAC address corresponding to the at least one second PE device, and determines that the source MAC address is a virtual MAC address if the source MAC address carried in the packet is the same as a queried virtual MAC address corresponding to one of the at least one second PE device; determines that the source MAC address is not a virtual MAC address if the source MAC address carried in the packet is different from the queried virtual MAC address corresponding to any one of the at least one second PE device.

It may be understood that the first PE device may also determine whether the source media access control MAC address carried in the packet is a virtual MAC address through other manners.

In order to make it easier to understand and implement the above-mentioned solution of the embodiment of the present disclosure, some specific application scenarios are taken as an example to illustrate below. It is taken as an example for illustration below that methods corresponding to FIG. 3 to FIG. 8 are implemented in the network architecture shown in FIG. 1.

Figure 3:
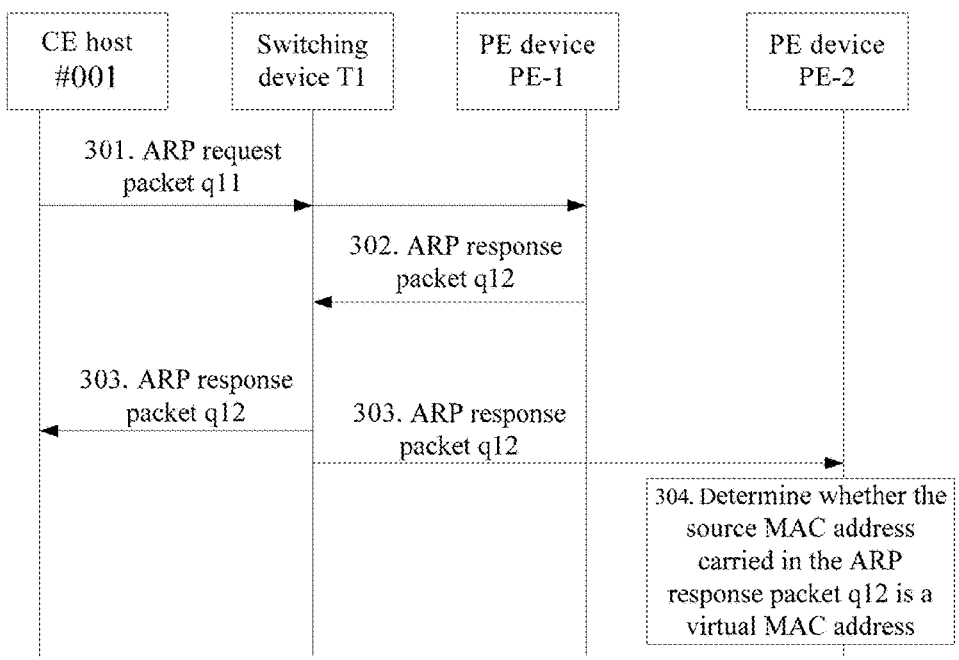
FIG. 3 is a schematic flowchart of another method for processing a host route in a virtual subnet provided in an embodiment of the present disclosure.

Referring to FIG. 3, FIG. 3 is a schematic flowchart of a method for processing a host route in a virtual subnet provided in another embodiment of the present disclosure. As shown in FIG. 3, the method for processing the host route in the virtual subnet provided in another embodiment of the present disclosure may include the following contents:

301. A CE host #001 sends an ARP request packet q11 used for requesting to obtain a MAC address of a CE host #004. The ARP request packet q11 carries an IP address (that is, a source IP address) and a MAC address (that is, a source MAC address) of the CE host #001, and the ARP request packet q11 also carries an IP address of the CE host #004 and the like.

302. APE-1 receives the ARP request packet q11. Herein, it is assumed that the PE-1 currently has learned a CE host route corresponding to a CE host #004, and then the PE-1 may serve as an ARP proxy to send an ARP response packet q12 for responding to the ARP request packet q11. A source MAC address carried in the ARP response packet q12 is a virtual MAC address corresponding to a virtual router that is associated with the PE-1, and a source IP address carried in the ARP response packet q12 is the IP address of the CE host #004.

303. A switching device T1 floods the received ARP response packet q12.

A PE-2 and the CE host #001 may receive the above-mentioned ARP response packet q12.

304. A PE-2 determines whether the source MAC address carried in the ARP response packet q12 is a virtual MAC address.

If determining that the source MAC address carried in the ARP response packet q12 is a virtual MAC address, the PE-2 skips performing at least one of the following operations: saving a local CE host routing table entry corresponding to the source IP address carried in the ARP response packet q12, and distributing a local CE host route corresponding to the IP address in the virtual subnet based on a routing protocol of a layer 3 VPN (for example, a gateway border protocol).

If determining that the source MAC address carried in the ARP response packet q12 is not a virtual MAC address, PE-2 performs at least one of the following operations: saving a local CE host routing table entry corresponding to the source IP address carried in the ARP response packet q12, and distributing a local CE host route corresponding to the IP address in the virtual subnet based on a routing protocol of a layer 3 VPN.

In some embodiments of the present disclosure, the determining, by PE-2, whether the source MAC address carried in the ARP response packet q12 is a virtual MAC address may include: PE-2 may determine that the source MAC address is a virtual MAC address if the source MAC address carried in the ARP response packet q12 is the same as a virtual MAC address corresponding to a virtual router that is associated with PE-2; PE-2 determines that the source MAC address is not a virtual MAC address if the source MAC address is different from the virtual MAC address corresponding to the virtual router that is associated with PE-2. In such scenario, it is mainly taken as an example for illustration that PE devices in the same virtual subnet site are assumed to associate with the same virtual router.

In some other embodiments of the present disclosure, the determining, by PE-2, whether the source media access control MAC address carried in the ARP response packet q12 is a virtual MAC address may include: PE-2 queries a virtual MAC address corresponding to a virtual router that is associated with PE-1, and PE-2 may determine that the source MAC address carried in the ARP response packet q12 is a virtual MAC address if the source MAC address carried in the ARP response packet q12 is the same as a queried virtual MAC address corresponding to the virtual router that is associated with PE-1; PE-2 may determine that the source MAC address carried in the ARP response packet q12 is not a virtual MAC address if the source MAC address carried in the ARP response packet q12 is different from the queried virtual MAC address corresponding to the virtual router that is associated with PE-1.

It may be understood that PE-2 may also determine whether the source media access control MAC address carried in the ARP response packet q12 is a virtual MAC address through other manners.

It can be seen from the above, in the technical solution of the embodiment of the present disclosure, after receiving an ARP response packet, PE-2 first determines whether a source MAC address carried in the ARP packet is a virtual MAC address; and if determining that the source MAC address is a virtual MAC address, PE-2 does not save a local CE host routing table entry corresponding to a source IP address carried in the above-mentioned ARP response packet, and/or does not distribute a local CE host route corresponding to the above-mentioned IP address in the virtual subnet based on a routing protocol of a layer 3 VPN, and the virtual subnet site in which PE-2 is located further includes at least one other PE device. A research finds that the ARP response packet whose source MAC address is a virtual MAC is generally sent by another PE device that is in the virtual subnet site in which PE-2 is located and that serves as an ARP proxy. Therefore, PE-2 identifies and determines whether the source MAC address carried in the received ARP response packet is a virtual MAC address, so as to identify a case whether the ARP response packet is sent by the another PE device that is in the virtual subnet site in which PE-2 is located and that serves as an ARP proxy, and corresponding to such case (that is, if PE-2 determines that the above-mentioned source MAC address is a virtual MAC address), PE-2 does not save a local CE host routing table entry corresponding to the source IP address carried in the above-mentioned ARP packet, and/or does not distribute a local CE host route corresponding to the above-mentioned source IP address in the virtual subnet based on a routing protocol of a layer 3 VPN. In this way, it is helpful to eliminate that a PE device stores (uses) and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

Figure 4:
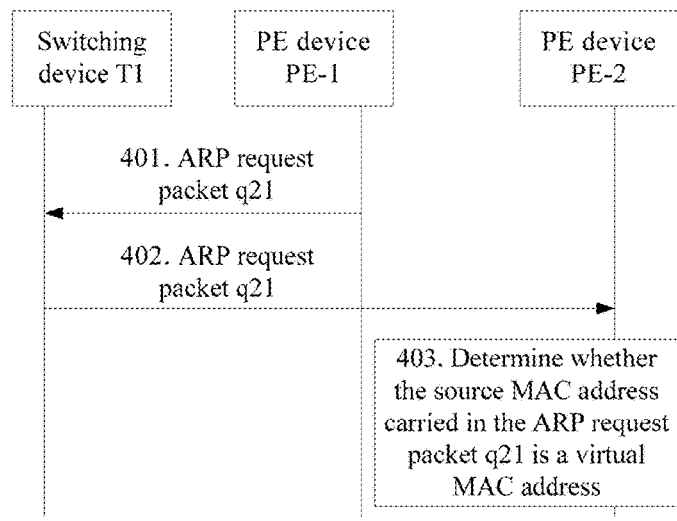
FIG. 4 is a schematic flowchart of another method for processing a host route in a virtual subnet provided in an embodiment of the present disclosure.

Referring to FIG. 4, FIG. 4 is a schematic flowchart of a method for processing a host route in a virtual subnet provided in another embodiment of the present disclosure. The method for processing the host route in the virtual subnet provided in another embodiment of the present disclosure may include the following contents.

401. PE-1 serves as an ARP Proxy of CE host #004 to send an ARP request packet q21.

A source IP address of the ARP request packet q21 is an IP address of CE host #004. Here it is assumed that PE-1 has currently learned a CE host route corresponding to CE host #004 and then a source MAC address carried in the ARP request packet q21 may be a virtual MAC address corresponding to PE-1.

402. A switching device T1 floods the received ARP request packet q21.

PE-2 may receive the above-mentioned ARP request packet q21.

403. PE-2 determines whether the source MAC address carried in the ARP request packet q21 is a virtual MAC address.

If determining that the source MAC address carried in the ARP request packet q21 is a virtual MAC address, PE-2 skips performing at least one of the following operations: saving a local CE host routing table entry corresponding to the source IP address carried in the ARP request packet q21, and distributing a local CE host route corresponding to the IP address in the virtual subnet based on a routing protocol of a layer 3 VPN (for example, a gateway border protocol).

If determining that the source MAC address carried in the ARP request packet q21 is not a virtual MAC address, PE-2 performs at least one of the following operations: saving a local CE host routing table entry corresponding to the source IP address carried in the ARP request packet q21, and distributing a local CE host route corresponding to the IP address in the virtual subnet based on the routing protocol of a layer 3 VPN (for example, a gateway border protocol).

In some embodiments of the present disclosure, the determining, by PE-2, whether the source MAC address carried in the ARP request packet q21 is a virtual MAC address may include: PE-2 may determine that the source MAC address is a virtual MAC address if the source MAC address carried in the ARP request packet q21 is the same as a virtual MAC address corresponding to a virtual router that is associated with PE-2; PE-2 determines that the source MAC address is not a virtual MAC address if the source MAC address is different from the virtual MAC address corresponding to the virtual router that is associated with PE-2. In such scenario, it is mainly taken as an example for illustration that PE devices in the same virtual subnet site are assumed to associate with the same virtual router.

In some other embodiments of the present disclosure, the determining, by PE-2, whether the source media access control MAC address carried in the ARP request packet q21 is a virtual MAC address may include: PE-2 queries a virtual MAC address corresponding to a virtual router that is associated with PE-1, and PE-2 may determine that the source MAC address carried in the ARP request packet q21 is a virtual MAC address if the source MAC address carried in the ARP request packet q21 is the same as a queried virtual MAC address corresponding to the virtual router that is associated with PE-1; PE-2 may determine that the source MAC address carried in the ARP request packet q21 is not a virtual MAC address if the source MAC address carried in the ARP request packet q21 is different from the queried virtual MAC address corresponding to the virtual router that is associated with PE-1.

It may be understood that PE-2 may also determine whether the source media access control MAC address carried in the ARP request packet q21 is a virtual MAC address through other manners.

It can be seen from the above, in the technical solution of the embodiment of the present disclosure, after receiving an ARP request packet, PE-2 first determines whether a source MAC address carried in the ARP packet is a virtual MAC address; and if determining that the source MAC address is a virtual MAC address, PE-2 does not save a local CE host routing table entry corresponding to a source IP address carried in the above-mentioned ARP request packet, and/or PE-2 does not distribute a local CE host route corresponding to the above-mentioned IP address in the virtual subnet based on a routing protocol of a layer 3 VPN, and the virtual subnet site in which PE-2 is located further includes at least one other PE device. A research finds that the ARP request packet whose source MAC address is a virtual MAC is generally sent by another PE device that is in the virtual subnet site in which PE-2 is located and that serves as an ARP proxy. Therefore, PE-2 identifies and determines whether the source MAC address carried in the received ARP request packet is a virtual MAC address, so as to identify a case whether the ARP request packet is sent by the another PE device that is in the virtual subnet site in which PE-2 is located and that serves as an ARP proxy, and corresponding to such case (that is, if PE-2 determines that the above-mentioned source MAC address is a virtual MAC address), PE-2 does not save a local CE host routing table entry corresponding to the source IP address carried in the above-mentioned ARP packet, and/or does not distribute a local CE host route corresponding to the above-mentioned source IP address in the virtual subnet based on a routing protocol of a layer 3 VPN. In this way, it is helpful to eliminate that a PE device stores (uses) and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

Figure 5:
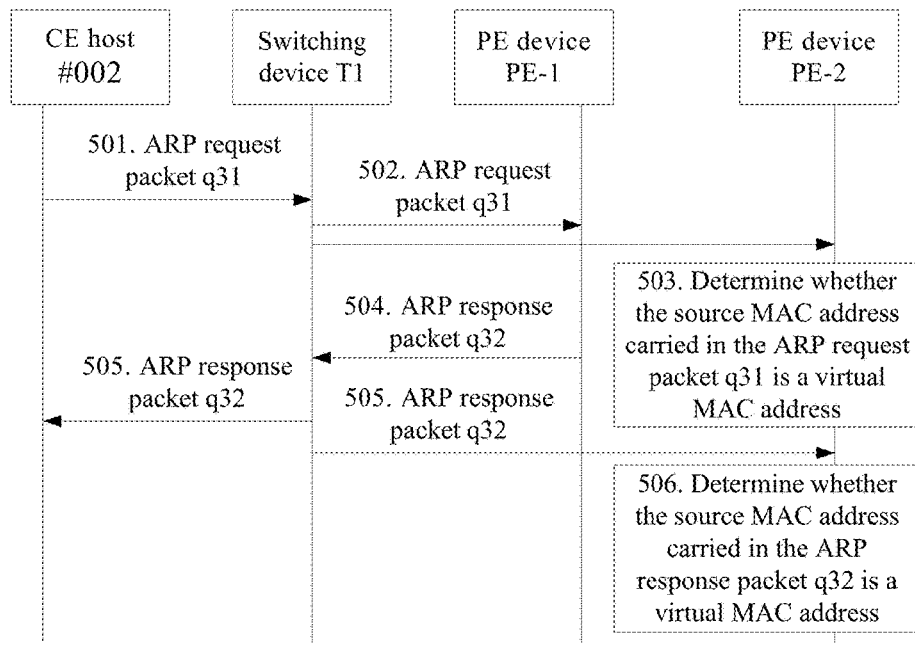
FIG. 5 is a schematic flowchart of another method for processing a host route in a virtual subnet provided in an embodiment of the present disclosure.

Referring to FIG. 5, FIG. 5 is a schematic flowchart of a method for processing a host route in a virtual subnet provided in another embodiment of the present disclosure. The method for processing the host route in the virtual subnet provided in another embodiment of the present disclosure may include the following contents.

501. CE host #002 sends an ARP request packet q31 used for requesting to obtain a MAC address of CE host #004. The ARP request packet q31 carries an IP address (that is, source IP address) and a MAC address (that is, source MAC address) of CE host #002, and the ARP request packet q31 also carries an IP address of CE host #004 and the like.

502. A switching device T1 floods received ARP request packet q31.

PE-1 and PE-2 may receive the above-mentioned ARP request packet q31.

503. PE-2 determines whether the source MAC address carried in the ARP request packet q31 is a virtual MAC address.

If determining that the source MAC address carried in the ARP request packet q31 is a virtual MAC address, PE-2 skips performing at least one of the following operations: saving a local CE host routing table entry corresponding to the source IP address carried in the ARP request packet q31, and distributing a local CE host route corresponding to the IP address in the virtual subnet based on a routing protocol of a layer 3 VPN (for example, a gateway border protocol).

If determining that the source MAC address carried in the ARP request packet q31 is not a virtual MAC address, PE-2 performs at least one of the following operations: saving a local CE host routing table entry corresponding to the source IP address carried in the ARP request packet q31, and distributing a local CE host route corresponding to the IP address in the virtual subnet based on the routing protocol of a layer 3 VPN (for example, a gateway border protocol).

In some embodiments of the present disclosure, the determining, by PE-2, whether the source MAC address carried in the ARP request packet q31 is a virtual MAC address may include: PE-2 may determine that the source MAC address is a virtual MAC address if the source MAC address carried in the ARP request packet q31 is the same as a virtual MAC address corresponding to a virtual router that is associated with PE-2; PE-2 determines that the source MAC address is not a virtual MAC address if the source MAC address is different from the virtual MAC address corresponding to the virtual router that is associated with PE-2. In such scenario, it is mainly taken as an example for illustration that PE devices in the same virtual subnet site are assumed to associate with the same virtual router.

In some other embodiments of the present disclosure, the determining, by PE-2, whether the source media access control MAC address carried in the ARP request packet q31 is a virtual MAC address may include: PE-2 queries a virtual MAC address corresponding to a virtual router that is associated with PE-1, and PE-2 may determine that the source MAC address carried in the ARP request packet q31 is a virtual MAC address if the source MAC address carried in the ARP request packet q31 is the same as a queried virtual MAC address corresponding to the virtual router that is associated with PE-1; PE-2 may determine that the source MAC address carried in the ARP request packet q31 is not a virtual MAC address if the source MAC address carried in the ARP request packet q31 is different from the queried virtual MAC address corresponding to the virtual router that is associated with PE-1.

It may be understood that PE-2 may also determine whether the source media access control MAC address carried in the ARP request packet q31 is a virtual MAC address through other manners.

504. PE-1 receives the ARP request packet q31. Here, it is assumed that PE-1 has currently learned a CE host route corresponding to CE host #004 and then PE-1 may serve as an ARP proxy to send an ARP response packet q32 for responding to the ARP request packet q31. A source MAC address carried in the ARP response packet q32 is a virtual MAC address corresponding to a virtual router that is associated with PE-1, and a source IP address carried in the ARP response packet q32 is the IP address of CE host #004.

505. The switching device T1 floods received ARP response packet q32.

PE-2 and CE host #002 may receive the above-mentioned ARP response packet q32.

506. PE-2 determines whether the source MAC address carried in the ARP response packet q32 is a virtual MAC address.

If determining that the source MAC address carried in the ARP response packet q32 is a virtual MAC address, PE-2 skips performing at least one of the following operations: saving a local CE host routing table entry corresponding to the source IP address carried in the ARP response packet q32, and distributing a local CE host route corresponding to the IP address in the virtual subnet based on the routing protocol of a layer 3 VPN (for example, a gateway border protocol).

If determining that the source MAC address carried in the ARP response packet q32 is not a virtual MAC address, PE-2 performs at least one of the following operations:

saving a local CE host routing table entry corresponding to the source IP address carried in the ARP response packet q32, and distributing a local CE host route corresponding to the IP address in the virtual subnet based on the routing protocol of a layer 3 VPN (for example, a gateway border protocol).

In some embodiments of the present disclosure, the determining, by PE-2, whether the source MAC address carried in the ARP request packet q31 is a virtual MAC address may include: PE-2 may determine that the source MAC address is a virtual MAC address if the source MAC address carried in the ARP request packet q31 is the same as a virtual MAC address corresponding to a virtual router that is associated with PE-2; PE-2 determines that the source MAC address is not a virtual MAC address if the source MAC address is different from the virtual MAC address corresponding to the virtual router that is associated with PE-2. In such scenario, it is mainly taken as an example for illustration that PE devices in the same virtual subnet site are assumed to associate with the same virtual router.

In some other embodiments of the present disclosure, the determining, by PE-2, whether the source media access control MAC address carried in the ARP response packet q32 is a virtual MAC address may include: PE-2 queries a virtual MAC address corresponding to a virtual router that is associated with PE-1, and PE-2 may determine that the source MAC address carried in the ARP response packet q32 is a virtual MAC address if the source MAC address carried in the ARP response packet q32 is the same as a queried virtual MAC address corresponding to the virtual router that is associated with PE-1; PE-2 may determine that the source MAC address carried in the ARP response packet q32 is not a virtual MAC address if the source MAC address carried in the ARP response packet q32 is different from the queried virtual MAC address corresponding to the virtual router that is associated with PE-1.

It may be understood that PE-2 may also determine whether the source media access control MAC address carried in the ARP response packet q32 is a virtual MAC address through other manners.

It can be seen from the above, in the technical solution of the embodiment of the present disclosure, after receiving an ARP packet, PE-2 first determines whether a source MAC address carried in the ARP packet is a virtual MAC address; and if determining that the source MAC address is a virtual MAC address, PE-2 does not save a local CE host routing table entry corresponding to a source IP address carried in the above-mentioned ARP packet, and/or PE-2 does not distribute a local CE host route corresponding to the above-mentioned IP address in the virtual subnet based on a routing protocol of a layer 3 VPN, and the virtual subnet site in which PE-2 is located further includes at least one other PE device. A research finds that the ARP packet whose source MAC address is a virtual MAC is generally sent by another PE device that is in the virtual subnet site in which PE-2 is located and that serves as an ARP proxy. Therefore, PE-2 identifies and determines whether the source MAC address carried in the received ARP packet is a virtual MAC address, so as to identify a case whether the ARP packet is sent by the another PE device in the virtual subnet site in which PE-2 is located and that serves as an ARP proxy, and corresponding to such case (that is, PE-2 determines that the above-mentioned source MAC address is a virtual MAC address), PE-2 does not save a local CE host routing table entry corresponding to the source IP address carried in the above-mentioned ARP packet, and/or does not distribute a local CE host route corresponding to the above-mentioned source IP address in the virtual subnet based on a routing protocol of a layer 3 VPN. In this way, it is helpful to eliminate that a PE device stores (uses) and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

Figure 6:
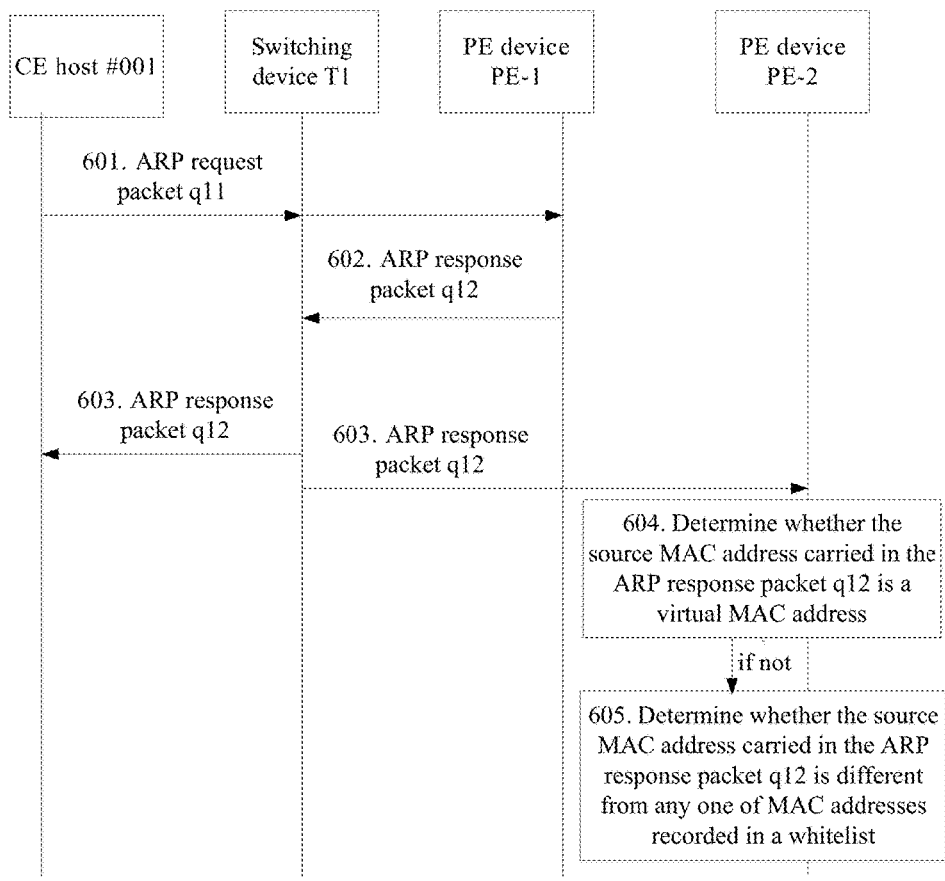
FIG. 6 is a schematic flowchart of another method for processing a host route in a virtual subnet provided in an embodiment of the present disclosure.

Referring to FIG. 6, FIG. 6 is a schematic flowchart of a method for processing a host route in a virtual subnet provided in another embodiment of the present disclosure. As shown in FIG. 6, the method for processing the host route in the virtual subnet provided in another embodiment of the present disclosure may include the following contents.

601. CE host #001 sends an ARP request packet q11 used for requesting to obtain a MAC address of CE host #004. The ARP request packet q11 carries an IP address (that is, source IP address) and a MAC address (that is, source MAC address) of CE host #001, and the ARP request packet q11 also carries an IP address of CE host #004 and the like.

602. PE-1 receives the ARP request packet q11. Here, it is assumed that PE-1 has currently learned a CE host route corresponding to CE host #004 and then PE-1 may serve as an ARP proxy to send an ARP response packet q12 for responding to the ARP request packet q11. A source MAC address carried in the ARP response packet q12 is a virtual MAC address corresponding to a virtual router that is associated with PE-1, and a source IP address carried in the ARP response packet q12 is the IP address of CE host #004.

603. A switching device T1 floods the received ARP response packet q12.

PE-2 and CE host #001 may receive the above-mentioned ARP response packet q12.

604. PE-2 determines whether the source MAC address carried in the ARP response packet q12 is a virtual MAC address.

If not, step 605 is performed.

If determining that the source MAC address carried in the ARP response packet q12 is a virtual MAC address, PE-2 skips performing at least one of the following operations: saving a local CE host routing table entry corresponding to the source IP address carried in the ARP response packet q12, and distributing a local CE host route corresponding to the IP address in the virtual subnet based on a routing protocol of a layer 3 VPN (for example, a gateway border protocol).

605. If determining that the source MAC address carried in the ARP response packet q12 is not a virtual MAC address, PE-2 determines whether the source MAC address carried in the ARP response packet q12 is different from any one of MAC addresses recorded in a whitelist.

If determining that the source MAC address carried in the ARP response packet q12 is different from any one of MAC addresses recorded in the whitelist, PE-2 may skip performing at least one of the following operations: saving a local CE host routing table entry corresponding to the source IP address, and distributing a local CE host route corresponding to the IP address in the virtual subnet based on the routing protocol of a layer 3 VPN.

If determining that the source MAC address carried in the ARP response packet q12 is the same as one of MAC addresses recorded in the whitelist, PE-2 may perform at least one of the following operations: saving a local CE host routing table entry corresponding to the source IP address, and distributing a local CE host route corresponding to the IP address in the virtual subnet based on the routing protocol of a layer 3 VPN.

It can be understood that, since a whitelist control mechanism is further introduced, it is helpful to implement route distribution control more flexibly. Further, the above-mentioned PE-2 also may update the whitelist according to an instruction.

In some embodiments of the present disclosure, the determining, by PE-2, whether the source MAC address carried in the ARP request packet q21 is a virtual MAC address may include: PE-2 may determine that the source MAC address is a virtual MAC address if the source MAC address carried in the ARP request packet q21 is the same as a virtual MAC address corresponding to a virtual router that is associated with PE-2; PE-2 determines that the source MAC address is not a virtual MAC address if the source MAC address is different from the virtual MAC address corresponding to the virtual router that is associated with PE-2. In such scenario, it is mainly taken as an example for illustration that PE devices in the same virtual subnet site are assumed to associate with the same virtual router.

In some other embodiments of the present disclosure, the determining, by PE-2, whether the source media access control MAC address carried in the ARP request packet q21 is a virtual MAC address may include: PE-2 queries a virtual MAC address corresponding to a virtual router that is associated with PE-1, and PE-2 may determine that the source MAC address carried in the ARP request packet q21 is a virtual MAC address if the source MAC address carried in the ARP request packet q21 is the same as a queried virtual MAC address corresponding to the virtual router that is associated with PE-1; PE-2 may determine that the source MAC address carried in the ARP request packet q21 is not a virtual MAC address if the source MAC address carried in the ARP request packet q21 is different from the queried virtual MAC address corresponding to the virtual router that is associated with PE-1.

It may be understood that PE-2 may also determine whether the source MAC address carried in the ARP request packet q21 is a virtual MAC address through other manners.

It can be seen from the above, in the technical solution of the embodiment of the present disclosure, after receiving an ARP response packet, PE-2 first determines whether a source MAC address carried in the ARP packet is a virtual MAC address; and if determining that the source MAC address is a virtual MAC address, PE-2 does not save a local CE host routing table entry corresponding to a source IP address carried in the above-mentioned ARP response packet, and/or PE-2 does not distribute a local CE host route corresponding to the above-mentioned IP address in the virtual subnet based on a routing protocol of a layer 3 VPN, and the virtual subnet site in which PE-2 is located further includes at least one other PE device. A research finds that the ARP response packet whose source MAC address is a virtual MAC is generally sent by another PE device that is in the virtual subnet site in which PE-2 is located and that serves as an ARP proxy. Therefore, PE-2 identifies and determines whether the source MAC address carried in the received ARP response packet is a virtual MAC address, so as to identify a case whether the ARP response packet is sent by the another PE device in the virtual subnet site in which PE-2 is located and that serves as an ARP proxy, and corresponding to such case (that is, if PE-2 determines that the above-mentioned source MAC address is a virtual MAC address), PE-2 does not save a local CE host routing table entry corresponding to the source IP address carried in the above-mentioned ARP packet, and/or does not distribute a local CE host route corresponding to the above-mentioned source IP address in the virtual subnet based on a routing protocol of a layer 3 VPN. In this way, it is helpful to eliminate that a PE device stores (uses) and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

Figure 7:
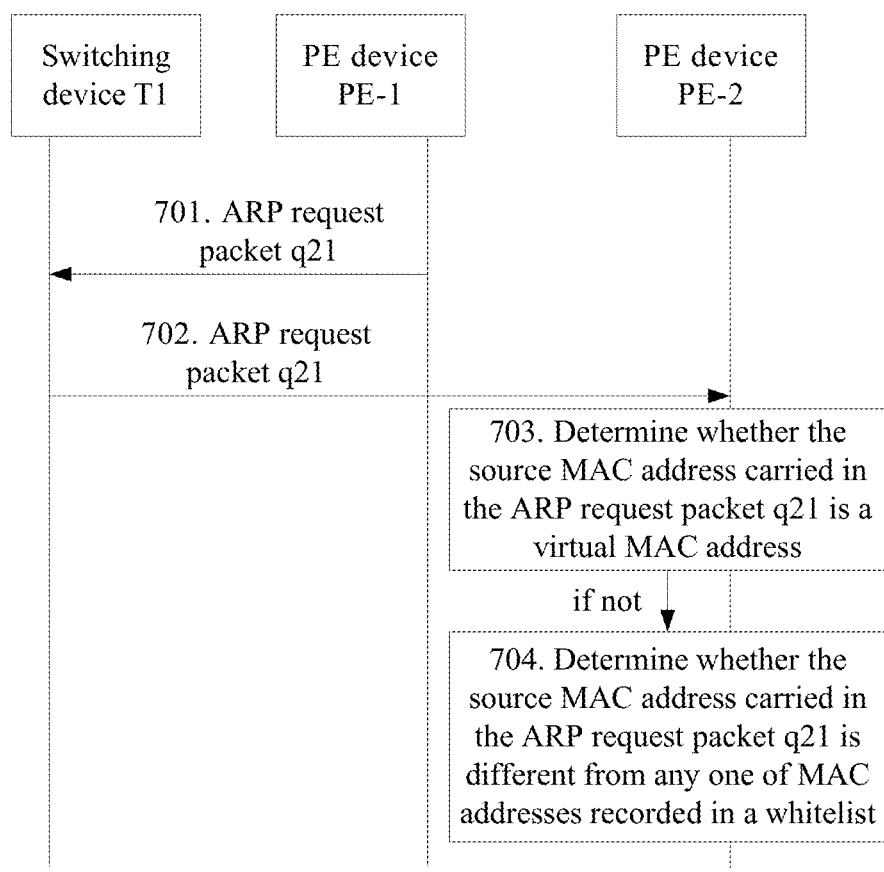
FIG. 7 is a schematic flowchart of another method for processing a host route in a virtual subnet provided in an embodiment of the present disclosure.

Referring to FIG. 7, FIG. 7 is a schematic flowchart of a method for processing a host route in a virtual subnet provided in another embodiment of the present disclosure. The method for processing the host route in the virtual subnet provided in another embodiment of the present disclosure may include the following contents.

701. PE-1 serves as an ARP Proxy of CE host #004 to send an ARP request packet q21.

A source IP address of the ARP request packet q21 is an IP address of CE host #004. Here it is assumed that PE-1 has currently learned a CE host route corresponding to CE host #004 and then a source MAC address carried in the ARP request packet q21 may be a virtual MAC address corresponding to PE-1.

702. A switching device T1 floods the received ARP request packet q21.

PE-2 may receive the above-mentioned ARP request packet q21.

703. PE-2 determines whether the source MAC address carried in the ARP request packet q21 is a virtual MAC address.

If not, step 704 is performed.

If determining that the source MAC address carried in the ARP request packet q21 is a virtual MAC address, PE-2 skips performing at least one of the following operations: saving a local CE host routing table entry corresponding to the source IP address carried in the ARP response packet q12, and distributing a local CE host route corresponding to the IP address in the virtual subnet based on a routing protocol of a layer 3 VPN (for example, a gateway border protocol).

704. If determining that the source MAC address carried in the ARP request packet q21 is not a virtual MAC address, PE-2 determines whether the source MAC address carried in the ARP request packet q21 is different from any one of MAC addresses recorded in a whitelist.

If determining that the source MAC address carried in the ARP request packet q21 is different from any one of MAC addresses recorded in the whitelist, PE-2 may skip performing at least one of the following operations: saving a local CE host routing table entry corresponding to the source IP address, and distributing a local CE host route corresponding to the IP address in the virtual subnet based on the routing protocol of a layer 3 VPN.

If determining that the source MAC address carried in the ARP request packet q21 is the same as one of MAC addresses recorded in the whitelist, PE-2 may perform at least one of the following operations: saving a local CE host routing table entry corresponding to the source IP address, and distributing a local CE host route corresponding to the IP address in the virtual subnet based on a routing protocol of a layer 3 VPN.

It can be understood that, since a whitelist control mechanism is further introduced, it is helpful to implement route distribution control more flexibly. Further, the above-mentioned PE-2 also may update the whitelist according to an instruction.

In some embodiments of the present disclosure, the determining, by PE-2, whether the source MAC address carried in the ARP request packet q21 is a virtual MAC address may include: PE-2 may determine that the source MAC address is a virtual MAC address if the source MAC address carried in the ARP request packet q21 is the same as a virtual MAC address corresponding to a virtual router that is associated with PE-2; PE-2 determines that the source MAC address is not a virtual MAC address if the source MAC address is different from the virtual MAC address corresponding to the virtual router that is associated with PE-2. In such scenario, it is mainly taken as an example for illustration that PE devices in the same virtual subnet site are assumed to associate with the same virtual router.

In some other embodiments of the present disclosure, the determining, by PE-2, whether the source media access control MAC address carried in the ARP request packet q21 is a virtual MAC address may include: PE-2 queries a virtual MAC address corresponding to a virtual router that is associated with PE-1, and PE-2 may determine that the source MAC address carried in the ARP request packet q21 is a virtual MAC address if the source MAC address carried in the ARP request packet q21 is the same as a queried virtual MAC address corresponding to the virtual router that is associated with PE-1; PE-2 may determine that the source MAC address carried in the ARP request packet q21 is not a virtual MAC address if the source MAC address carried in the ARP request packet q21 is different from the queried virtual MAC address corresponding to the virtual router that is associated with PE-1.

It may be understood that PE-2 may also determine whether the source MAC address carried in the ARP request packet q21 is a virtual MAC address through other manners.

It can be seen from the above, in the technical solution of the embodiment of the present disclosure, after receiving an ARP request packet, PE-2 first determines whether a source MAC address carried in the ARP packet is a virtual MAC address; and if determining that the source MAC address is a virtual MAC address, PE-2 does not save a local CE host routing table entry corresponding to a source IP address carried in the above-mentioned ARP request packet, and/or PE-2 does not distribute a local CE host route corresponding to the above-mentioned IP address in the virtual subnet based on a routing protocol of a layer 3 VPN, and the virtual subnet site in which PE-2 is located further includes at least one other PE device. A research finds that the ARP request packet whose source MAC address is a virtual MAC is generally sent by another PE device that is in the virtual subnet site in which PE-2 is located and that serves as an ARP proxy. Therefore, PE-2 identifies and determines whether the source MAC address carried in the received ARP request packet is a virtual MAC address, so as to identify a case whether the ARP request packet is sent by the another PE device that is in the virtual subnet site in which PE-2 is located and that serves as an ARP proxy, and corresponding to such case (that is, if PE-2 determines that the above-mentioned source MAC address is a virtual MAC address), PE-2 does not save a local CE host routing table entry corresponding to the source IP address carried in the above-mentioned ARP packet, and/or does not distribute a local CE host route corresponding to the above-mentioned source IP address in the virtual subnet based on a routing protocol of a layer 3 VPN. In this way, it is helpful to eliminate that a PE device stores (uses) and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

Figure 8:
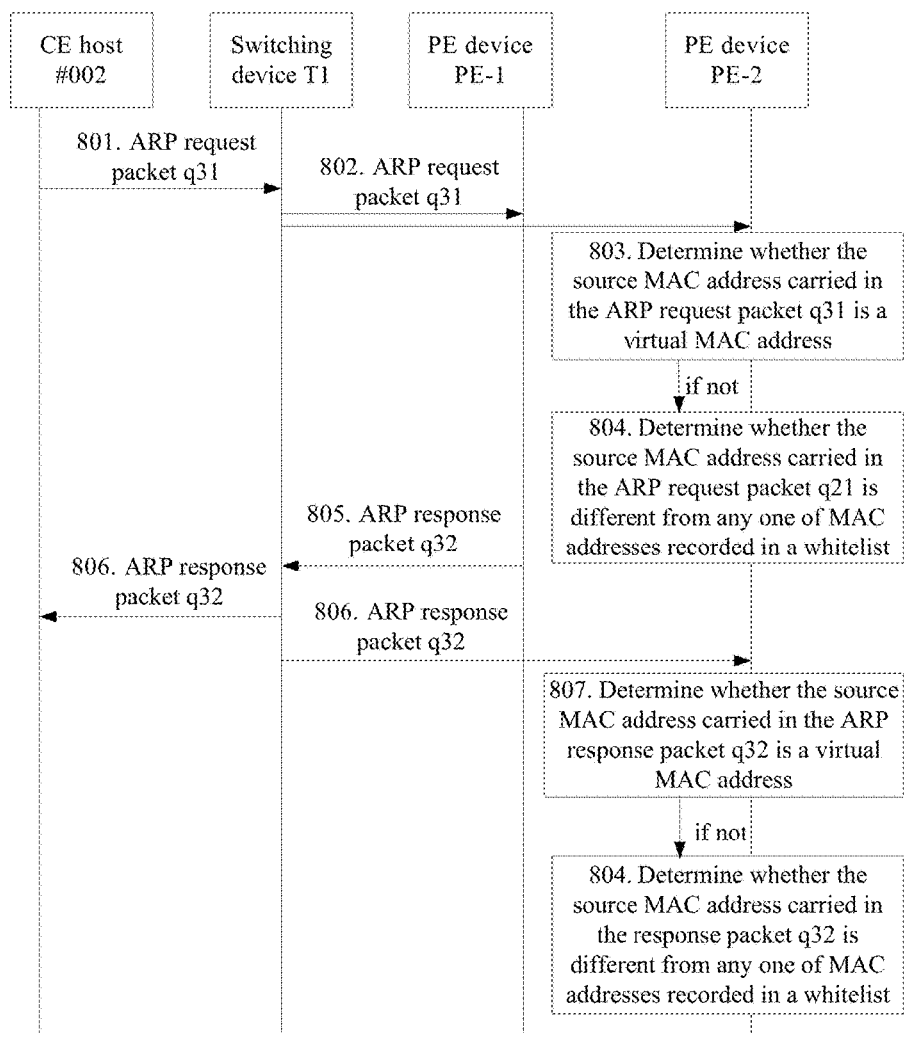
FIG. 8 is a schematic flowchart of another method for processing a host route in a virtual subnet provided in an embodiment of the present disclosure.

Referring to FIG. 8, FIG. 8 is a schematic flowchart of a method for processing a host route in a virtual subnet provided in another embodiment of the present disclosure. The method for processing the host route in the virtual subnet provided in another embodiment of the present disclosure may include the following contents.

801. CE host #002 sends an ARP request packet q31 used for requesting to obtain a MAC address of CE host #004. The ARP request packet q31 carries an IP address (that is, source IP address) and a MAC address (that is, source MAC address) of CE host #002, and the ARP request packet q31 also carries an IP address of CE host #004 and the like.

802. A switching device T1 floods received ARP request packet q31.

PE-1 and PE-2 may receive the above-mentioned ARP request packet q31.

803. PE-2 determines whether the source MAC address carried in the ARP request packet q31 is a virtual MAC address.

If not, step 804 is performed.

If determining that the source MAC address carried in the ARP response packet q31 is a virtual MAC address, PE-2 skips performing at least one of the following operations: saving a local CE host routing table entry corresponding to the source IP address carried in the ARP response packet q31, and distributing a local CE host route corresponding to the IP address in the virtual subnet based on a routing protocol of a layer 3 VPN (for example, a gateway border protocol).

804. If determining that the source MAC address carried in the ARP request packet q31 is not a virtual MAC address, PE-2 determines whether the source MAC address carried in the ARP request packet q31 is different from any one of MAC addresses recorded in a whitelist.

If determining that the source MAC address carried in the ARP request packet q31 is different from any one of MAC addresses recorded in the whitelist, PE-2 may skip performing at least one of the following operations: saving a local CE host routing table entry corresponding to the source IP address, and distributing a local CE host route corresponding to the IP address in the virtual subnet based on the routing protocol of a layer 3 VPN.

If determining that the source MAC address carried in the ARP request packet q31 is the same as one of MAC addresses recorded in the whitelist, PE-2 may perform at least one of the following operations: saving a local CE host routing table entry corresponding to the source IP address, and distributing a local CE host route corresponding to the IP address in the virtual subnet based on the routing protocol of a layer 3 VPN.

It can be understood that, since a whitelist control mechanism is further introduced, it is helpful to implement route distribution control more flexibly. Further, the above-mentioned PE-2 also may update the whitelist according to an instruction.

In some embodiments of the present disclosure, the determining, by PE-2, whether the source MAC address carried in the ARP request packet q31 is a virtual MAC address may include: PE-2 may determine that the source MAC address is a virtual MAC address if the source MAC address carried in the ARP request packet q31 is the same as a virtual MAC address corresponding to a virtual router that is associated with PE-2; PE-2 determines that the source MAC address is not a virtual MAC address if the source MAC address is different from the virtual MAC address corresponding to the virtual router that is associated with PE-2. In such scenario, it is mainly taken as an example for illustration that PE devices in the same virtual subnet site are assumed to associate with the same virtual router.

In some other embodiments of the present disclosure, the determining, by PE-2, whether the source media access control MAC address carried in the ARP request packet q31 is a virtual MAC address may include: PE-2 queries a virtual MAC address corresponding to a virtual router that is associated with PE-1, and PE-2 may determine that the source MAC address carried in the ARP request packet q31 is a virtual MAC address if the source MAC address carried in the ARP request packet q31 is the same as a queried virtual MAC address corresponding to the virtual router that is associated with PE-1; PE-2 may determine that the source MAC address carried in the ARP request packet q31 is not a virtual MAC address if the source MAC address carried in the ARP request packet q31 is different from the queried virtual MAC address corresponding to the virtual router that is associated with PE-1.

It may be understood that PE-2 may also determine whether the source media access control MAC address carried in the ARP request packet q31 is a virtual MAC address through other manners.

805. PE-1 receives the ARP request packet q31. Here, it is assumed that PE-1 has currently learned a CE host route corresponding to CE host #004 and then PE-1 may serve as an ARP proxy to send an ARP response packet q32 for responding to the ARP request packet q31. A source MAC address carried in the ARP response packet q32 is a virtual MAC address corresponding to a virtual router that is associated with PE-1, and a source IP address carried in the ARP response packet q32 is the IP address of CE host #004.

806. The switching device T1 floods received ARP response packet q32.

PE-2 and CE host #002 may receive the above-mentioned ARP response packet q32.

807. PE-2 determines whether the source MAC address carried in the ARP response packet q32 is a virtual MAC address.

If not, step 808 is performed.

If determining that the source MAC address carried in the ARP response packet q31 is a virtual MAC address, PE-2 skips performing at least one of the following operations: saving a local CE host routing table entry corresponding to the source IP address carried in the ARP response packet q31, and distributing a local CE host route corresponding to the IP address in the virtual subnet based on a routing protocol of a layer 3 VPN (for example, a gateway border protocol).

808. If determining that the source MAC address carried in the ARP response packet q32 is not a virtual MAC address, PE-2 determines whether the source MAC address carried in the ARP response packet q32 is different from any one of MAC addresses recorded in a whitelist.

If determining that the source MAC address carried in the ARP response packet q32 is different from any one of MAC addresses recorded in the whitelist, PE-2 may skip performing at least one of the following operations: saving a local CE host routing table entry corresponding to the source IP address, and distributing a local CE host route corresponding to the IP address in the virtual subnet based on the routing protocol of a layer 3 VPN.

If determining that the source MAC address carried in the ARP response packet q32 is the same as one of MAC addresses recorded in the whitelist, PE-2 may perform at least one of the following operations: saving a local CE host routing table entry corresponding to the source IP address, and distributing a local CE host route corresponding to the IP address in the virtual subnet based on the routing protocol of a layer 3 VPN.

In some embodiments of the present disclosure, the determining, by PE-2, whether the source MAC address carried in the ARP response packet q32 is a virtual MAC address may include: PE-2 may determine that the source MAC address is a virtual MAC address if the source MAC address carried in the ARP response packet q32 is the same as a virtual MAC address corresponding to a virtual router that is associated with PE-2; PE-2 determines that the source MAC address is not a virtual MAC address if the source MAC address is different from the virtual MAC address corresponding to the virtual router that is associated with PE-2. In such scenario, it is mainly taken as an example for illustration that PE devices in the same virtual subnet site are assumed to associate with the same virtual router.

In some other embodiments of the present disclosure, the determining, by PE-2, whether the source media access control MAC address carried in the ARP response packet q32 is a virtual MAC address may include: PE-2 queries a virtual MAC address corresponding to a virtual router that is associated with PE-1, and PE-2 may determine that the source MAC address carried in the ARP response packet q32 is a virtual MAC address if the source MAC address carried in the ARP response packet q32 is the same as a queried virtual MAC address corresponding to the virtual router that is associated with PE-1; PE-2 may determine that the source MAC address carried in the ARP response packet q32 is not a virtual MAC address if the source MAC address carried in the ARP response packet q32 is different from the queried virtual MAC address corresponding to the virtual router that is associated with PE-1.

It may be understood that PE-2 may also determine whether the source MAC address carried in the ARP response packet q32 is a virtual MAC address through other manners.

It can be seen from the above, in the technical solution of the embodiment of the present disclosure, after receiving an ARP packet, PE-2 first determines whether a source MAC address carried in the ARP packet is a virtual MAC address; and if determining that the source MAC address is a virtual MAC address, PE-2 does not save a local CE host routing table entry corresponding to a source IP address carried in the above-mentioned ARP packet, and/or PE-2 does not distribute a local CE host route corresponding to the above-mentioned source IP address in the virtual subnet based on a routing protocol of a layer 3 VPN, and the virtual subnet site in which PE-2 is located further includes at least one other PE device. A research finds that the ARP packet whose source MAC address is a virtual MAC is generally sent by another PE device that is in the virtual subnet site in which the first PE is located and that serves as an ARP proxy. Therefore, PE-2 identifies and determines whether the source MAC address carried in the received ARP packet is a virtual MAC address, so as to identify a case whether the ARP packet is sent by the another PE device that is in the virtual subnet site in which PE-2 is located and that serves as an ARP proxy, and corresponding to such case (that is, PE-2 determines that the above-mentioned source MAC address is a virtual MAC address), PE-2 does not save a local CE host routing table entry corresponding to the source IP address carried in the above-mentioned ARP packet, and/or does not distribute a local CE host route corresponding to the above-mentioned source IP address in the virtual subnet based on a routing protocol of a layer 3 VPN. In this way, it is helpful to eliminate that a PE device stores (uses) and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

It may be understood that an ARP scenario is mainly taken as an example for illustration in the embodiments corresponding to FIG. 3 to FIG. 8 and an ND protocol scenario may be performed in a same manner. An NS packet is similar to an ARP request packet and an NA packet is similar to an ARP response packet. PE-2 in the embodiments corresponding to FIG. 3 to FIG. 8 is similar to a first PE device in the embodiment corresponding to FIG. 2.

An embodiment of the present disclosure also provides a related device for implementing the above-mentioned solution.

Figure 9:
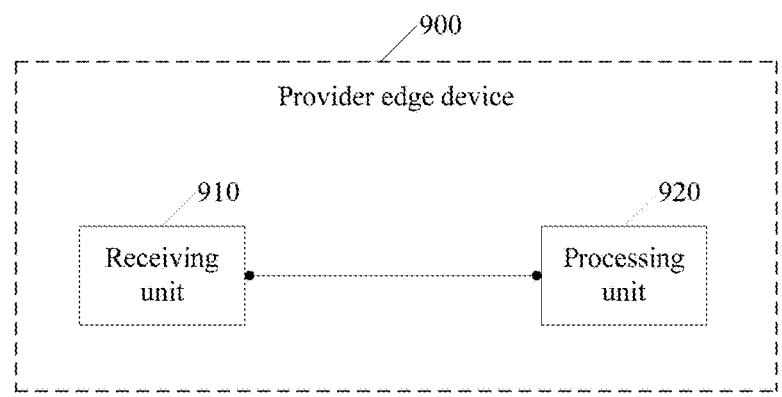
FIG. 9 is a schematic diagram of a structure of a PE device provided in an embodiment of the present disclosure.

Referring to FIG. 9, an embodiment of the present disclosure provides a provider edge device 900, which includes a receiving unit 910 and a processing unit 920.

The receiving unit 910 is configured to receive a packet for address resolution, where a virtual subnet site in which the provider edge device is located further includes at least one second provider edge device.

It may be understood that the packet for address resolution received by the receiving unit 910 may be from a second PE device, may also be from a CE device in the virtual subnet site in which the provider edge device 900 is located.

The packet for address resolution may be an ARP packet or an ND protocol packet or other packets for address resolution.

In some embodiments of the present disclosure, the above-mentioned ARP packet may be an ARP request packet or an ARP response packet. The above-mentioned ND protocol packet may be an NS packet or an NA packet.

The processing unit 920 is configured to: determine whether a source MAC address carried in the packet is a virtual MAC address; when it is determined that the source MAC address is a virtual MAC address, skip performing at least one of the following operations: saving a local customer edge CE host routing table entry corresponding to a source IP address carried in the packet, and distributing a local CE host route corresponding to the IP address in the virtual subnet based on a routing protocol of a layer 3 VPN.

Moreover, when it is determined that the above-mentioned source MAC address is a virtual MAC address, the processing unit 920 may not save an ARP entry or an ND protocol entry, where a mapping relationship between a source IP address and a source MAC address carried in the above-mentioned ARP packet is recorded in the ARP entry. A mapping relationship between a source IP address and a source MAC address carried in the above-mentioned ND protocol packet is recorded in the ND protocol entry.

In some embodiments of the present disclosure, the processing unit 920 is further configured to: when it is determined that the source MAC address is not a virtual MAC address, perform at least one of the following operations: saving a local CE host routing table entry corresponding to the source IP address, or distributing, in the virtual subnet based on the routing protocol, a local CE host route corresponding to the IP address of a layer 3 VPN.

In some embodiments of the present disclosure, the processing unit 920 is further configured to:

when it is determined that the source MAC address is not a virtual MAC address and the source MAC address is different from any one of MAC addresses recorded in a whitelist, skip performing at least one of the following operations: saving a local CE host routing table entry corresponding to the source IP address, or distributing, in the virtual subnet based on the routing protocol, a local CE host route corresponding to the IP address;

and/or when it is determined that the source MAC address is not a virtual MAC address and the source MAC address is the same as one of MAC addresses recorded in the whitelist, perform at least one of the following operations: saving a local CE host routing table entry corresponding to the source IP address, or distributing, in the virtual subnet based on the routing protocol, a local CE host route corresponding to the IP address.

In some embodiments of the present disclosure, the processing unit 920 is further configured to:

when it is determined that the source MAC address is not a virtual MAC address and the source MAC address is different from any one of MAC addresses recorded in a blacklist, perform at least one of the following operations: saving a local CE host routing table entry corresponding to the source IP address, or distributing, in the virtual subnet based on the routing protocol, a local CE host route corresponding to the IP address;

and/or when it is determined that the source MAC address is not a virtual MAC address and the source MAC address is the same as one of MAC addresses recorded in the blacklist, skip performing at least one of the following operations: saving a local CE host routing table entry corresponding to the source IP address, or distributing, in the virtual subnet based on the routing protocol, a local CE host route corresponding to the IP address.

In some embodiments of the present disclosure, in an aspect of the determining whether a source media access control MAC address carried in the packet is a virtual MAC address, the processing unit 920 is specifically configured to: determine that the source MAC address is a virtual MAC address if the source MAC address carried in the packet is the same as a virtual MAC address corresponding to the provider edge device; and determine that the source MAC address is not a virtual MAC address if the source MAC address is different from the virtual MAC address corresponding to the provider edge device.

In some embodiments of the present disclosure, in an aspect of the determining whether a source media access control MAC address carried in the packet is a virtual MAC address, the processing unit 920 is specifically configured to: query a virtual MAC address corresponding to at least one second provider edge device, and determine that the source MAC address is a virtual MAC address if the source MAC address carried in the packet is the same as a queried virtual MAC address corresponding to one of the at least one second provider edge device; determine that the source MAC address is not a virtual MAC address if the source MAC address carried in the packet is different from the queried virtual MAC address corresponding to any one of the at least one second provider edge device.

In some embodiments of the present disclosure, a virtual MAC address corresponding to a PE device (for example, the provider edge device 900 or the second PE device) may specifically be a virtual MAC address corresponding to a virtual router that is associated with the PE device.

It can be understood that, a local CE host routing table entry saved by the PE device points to a CE host in a site in which the PE device is located. A local CE host route distributed by the PE device points to a CE host in a site in which the PE device is located. In the embodiment of the present disclosure, the local CE host routing table entry saved by the PE device may include an IP address of a CE host and a next hop address. In the embodiment of the present disclosure, the local CE host route distributed by the PE device may include an IP address of a CE host and a next hop address.

It may be understood that function of functional modules of the provider edge device 900 in the embodiment may be specifically implemented according to the methods in the above-mentioned method embodiments, and the specific implementation process thereof may refer to the relevant description of the above-mentioned method embodiments and will not be described in detail herein.

It can be seen from the above, in the technical solution of the embodiment of the present disclosure, after receiving a packet for address resolution, the PE device 900 first determines whether a source MAC address carried in the packet for address resolution is a virtual MAC address; and when it is determined that the source MAC address is a virtual MAC address, a local CE host routing table entry corresponding to a source IP address carried in the above-mentioned ARP packet is not saved, and/or a local CE host route corresponding to the above-mentioned IP address is not distributed in the above-mentioned virtual subnet based on a routing protocol of a layer 3 VPN, and the virtual subnet site in which the PE device 900 is located further includes at least one second PE device. A research finds that the packet, whose source MAC address is a virtual MAC, for address resolution is generally sent by another PE device that is in the virtual subnet site in which the first PE is located and that serves as an address resolution proxy. Therefore, the PE device 900 identifies and determines whether the source MAC address carried in the received packet for address resolution is a virtual MAC address, so as to identify a case whether the packet for address resolution is sent by the another PE device that is in the virtual subnet site in which the first PE device is located and that serves as an address resolution proxy, and corresponding to such case (that is, when it is determined that the above-mentioned source MAC address is a virtual MAC address), the PE device 900 does not save a local CE host routing table entry corresponding to a source IP address carried in the above-mentioned packet for address resolution, and/or does not distribute a local CE host route corresponding to the above-mentioned IP address in the virtual subnet based on a routing protocol of a layer 3 VPN. In this way, it is helpful to eliminate that a PE device stores and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

Figure 10:
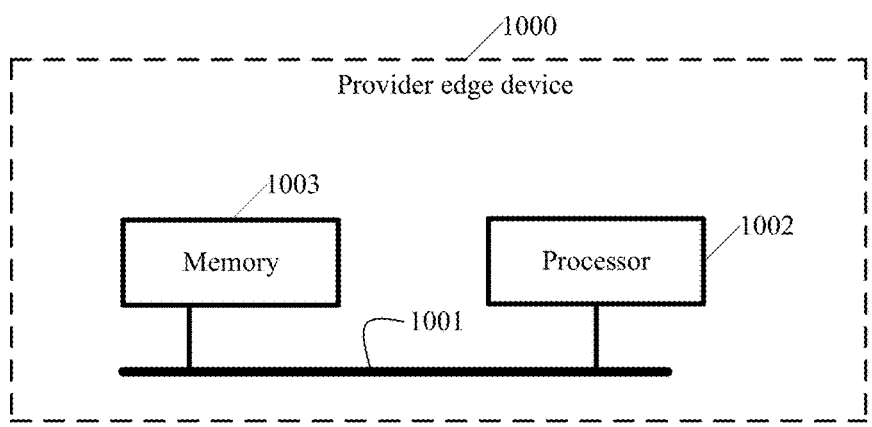
FIG. 10 is a schematic diagram of a structure of another PE device provided in an embodiment of the present disclosure.

Referring to FIG. 10, FIG. 10 is a schematic diagram of a PE device 1000 provided in an embodiment of the present disclosure. The PE device 1000 may include at least one bus 1001, at least one processor 1002 connected with the bus 1001 and at least one memory 1003 connected with the bus 1001.

The processor 1002 invokes a code stored in the memory 1003 through the bus 1001 to receive a packet for address resolution; determines whether a source media access control MAC address carried in the packet is a virtual MAC address; when it is determined that the source MAC address is a virtual MAC address, skips performing at least one of the following operations: saving a local customer edge CE host routing table entry corresponding to a source internet protocol IP address carried in the packet, or distributing, in the virtual subnet based on a routing protocol of a layer 3 virtual private network VPN, a local CE host route corresponding to the IP address. A virtual subnet site in which the PE device 1000 is located further includes at least one second provider edge device.

The packet for address resolution may be an ARP packet or an ND protocol packet or other packets for address resolution.

Moreover, when it is determined that the above-mentioned source MAC address is a virtual MAC address, the processor 1002 may not save an ARP entry or an ND protocol entry, where a mapping relationship between a source IP address and a source MAC address carried in the above-mentioned ARP packet is recorded in the ARP entry. A mapping relationship between a source IP address and a source MAC address carried in the above-mentioned ND protocol packet is recorded in the ND protocol entry.

In some embodiments of the present disclosure, the processor 1002 is further configured to: when it is determined that the source MAC address is not a virtual MAC address, perform at least one of the following operations: saving a local CE host routing table entry corresponding to the source IP address, or distributing, in the virtual subnet based on the routing protocol, a local CE host route corresponding to the IP address.

In some embodiments of the present disclosure, the processor 1002 is further configured to:

when it is determined that the source MAC address is not a virtual MAC address and the source MAC address is different from any one of MAC addresses recorded in a whitelist, skip performing at least one of the following operations: saving a local CE host routing table entry corresponding to the source IP address, or distributing, in the virtual subnet based on the routing protocol, a local CE host route corresponding to the IP address;

and/or when it is determined that the source MAC address is not a virtual MAC address and the source MAC address is the same as one of MAC addresses recorded in the whitelist, perform at least one of the following operations: saving a local CE host routing table entry corresponding to the source IP address, or distributing, in the virtual subnet based on the routing protocol, a local CE host route corresponding to the IP address.

In some embodiments of the present disclosure, the processor 1002 is further configured to:

when it is determined that the source MAC address is not a virtual MAC address and the source MAC address is different from any one of MAC addresses recorded in a blacklist, perform at least one of the following operations: saving a local CE host routing table entry corresponding to the source IP address, or distributing, in the virtual subnet based on the routing protocol, a local CE host route corresponding to the IP address;

and/or when it is determined that the source MAC address is not a virtual MAC address and the source MAC address is the same as one of MAC addresses recorded in the blacklist, skip performing at least one of the following operations: saving a local CE host routing table entry corresponding to the source IP address, or distributing, in the virtual subnet based on the routing protocol, a local CE host route corresponding to the IP address.

In some embodiments of the present disclosure, in an aspect of the determining whether a source media access control MAC address carried in the packet is a virtual MAC address, the processor 1002 is specifically configured to: determine that the source MAC address is a virtual MAC address if the source MAC address carried in the packet is the same as a virtual MAC address corresponding to the provider edge device; and determine that the source MAC address is not a virtual MAC address if the source MAC address is different from the virtual MAC address corresponding to the provider edge device.

In some embodiments of the present disclosure, in an aspect of the determining whether a source media access control MAC address carried in the packet is a virtual MAC address, the processor 1002 is specifically configured to: query a virtual MAC address corresponding to at least one second provider edge device, and determine that the source MAC address is a virtual MAC address if the source MAC address carried in the packet is the same as a queried virtual MAC address corresponding to one of the at least one second provider edge device; determine that the source MAC address is not a virtual MAC address if the source MAC address carried in the packet is different from the queried virtual MAC address corresponding to any one of the at least one second provider edge device.

In some embodiments of the present disclosure, a virtual MAC address corresponding to a PE device (for example, the provider edge device 1000 or the second PE device) may specifically be a virtual MAC address corresponding to a virtual router that is associated with the PE device.

It can be understood that, a local CE host routing table entry saved by the PE device points to a CE host in a site in which the PE device is located. A local CE host route distributed by the PE device points to a CE host in a site in which the PE device is located. In the embodiment of the present disclosure, the local CE host routing table entry saved by the PE device may include an IP address of a CE host and a next hop address. In the embodiment of the present disclosure, the local CE host route distributed by the PE device may include an IP address of a CE host and a next hop address.

It may be understood that function of functional modules of the provider edge device 1000 in the embodiment may be specifically implemented according to the methods in the above-mentioned method embodiments, and the specific implementation process thereof may refer to the relevant description of the above-mentioned method embodiments and will not be described in detail herein.

It can be seen from the above, in the technical solution of the embodiment of the present disclosure, after receiving a packet for address resolution, the PE device 1000 first determines whether a source MAC address carried in the packet for address resolution is a virtual MAC address; and when it is determined that the source MAC address is a virtual MAC address, a local CE host routing table entry corresponding to a source IP address carried in the above-mentioned ARP packet is not saved, and/or a local CE host route corresponding to the above-mentioned IP address is not distributed in the above-mentioned virtual subnet based on a routing protocol of a layer 3 VPN, and the virtual subnet site in which the PE device 1000 is located further includes at least one second PE device. A research finds that the packet, whose source MAC address is a virtual MAC, for address resolution is generally sent by another PE device that is in the virtual subnet site in which the first PE is located and that serves as an address resolution proxy. Therefore, the PE device 1000 identifies and determines whether the source MAC address carried in the received packet for address resolution is a virtual MAC address, so as to identify a case whether the packet for address resolution is sent by the another PE device that is in the virtual subnet site in which the first PE device is located and that serves as an address resolution proxy, and corresponding to such case (that is, when it is determined that the above-mentioned source MAC address is a virtual MAC address), the PE device 1000 does not save a local CE host routing table entry corresponding to a source IP address carried in the above-mentioned packet for address resolution, and/or the PE device 1000 does not distribute a local CE host route corresponding to the above-mentioned IP address in the virtual subnet based on a routing protocol of a layer 3 VPN. In this way, it is helpful to eliminate that a PE device stores and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

Figure 11:
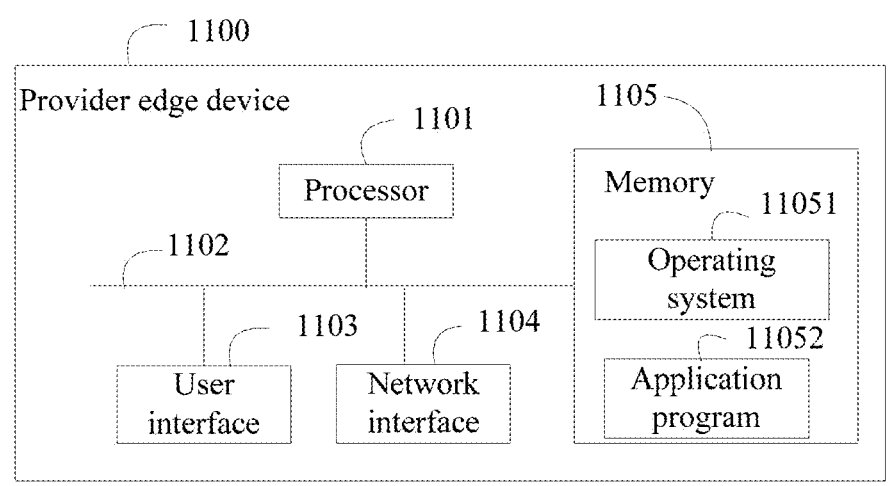
FIG. 11 is a schematic diagram of a structure of another PE device provided in an embodiment of the present disclosure.

Referring to FIG. 11, it is a block diagram of a structure of a PE device 1100 provided in another embodiment of the present disclosure. The PE device 1100 may include: at least one processor 1101, at least one network interface 1104 or other user interface 1103, a memory 1105 and at least one communications bus 1102. The communications bus 1102 is configured to implement a connection communication among these components. The PE device 1100, optionally, includes a user interface 1103, which includes a display (for example, a touch screen, a LCD, a CRT, a holographic or a projector), a clicking device (for example, a mouse, a trackball touch panel or a touch screen), a camera and/or a pickup device or the like.

The memory 1102 may include a read-only memory and a random access memory, and provides an instruction and data to the processor 1101. A part of the memory 1102 may further include a nonvolatile random access memory (NVRAM).

In some implementation manners, the memory 1105 stores the following elements, executable modules or data structures, or a subset thereof, or an extended set thereof:

an operating system 11051, which includes various system programs, used to implement various basic services and process a hardware-based task.

an application program module 11052, which includes various application programs, used to implement various application services.

The application program module 11052 includes but is not limited to the receiving unit 910 and the processing unit 920 and the like.

In the embodiment of the embodiment, through invoking a program or an instruction stored in the memory 1105, the processor 1101 is configured to receive a packet for address resolution; determine whether a source media access control MAC address carried in the packet is a virtual MAC address; when it is determined that the source MAC address is a virtual MAC address, skip performing at least one of the following operations: saving a local customer edge CE host routing table entry corresponding to a source internet protocol IP address carried in the packet, or distributing, in the virtual subnet based on a routing protocol of a layer 3 virtual private network VPN, a local CE host route corresponding to the IP address. A virtual subnet site in which the PE device 1100 is located further includes at least one second provider edge device.

The packet for address resolution may be an ARP packet or an ND protocol packet or other packets for address resolution.

Moreover, when it is determined that the above-mentioned source MAC address is a virtual MAC address, the processor 1101 may not save an ARP entry or an ND protocol entry, where a mapping relationship between a source IP address and a source MAC address carried in the above-mentioned ARP packet is recorded in the ARP entry. A mapping relationship between a source IP address and a source MAC address carried in the above-mentioned ND protocol packet is recorded in the ND protocol entry.

In some embodiments of the present disclosure, the processor 1101 is further configured to: when it is determined that the source MAC address is not a virtual MAC address, perform at least one of the following operations: saving a local CE host routing table entry corresponding to the source IP address, or distributing, in the virtual subnet based on the routing protocol, a local CE host route corresponding to the IP address.

In some embodiments of the present disclosure, the processor 1101 is further configured to:

when it is determined that the source MAC address is not a virtual MAC address and the source MAC address is different from any one of MAC addresses recorded in a whitelist, skip performing at least one of the following operations: saving a local CE host routing table entry corresponding to the source IP address, or distributing, in the virtual subnet based on the routing protocol, a local CE host route corresponding to the IP address;

and/or when it is determined that the source MAC address is not a virtual MAC address and the source MAC address is the same as one of MAC addresses recorded in the whitelist, perform at least one of the following operations: saving a local CE host routing table entry corresponding to the source IP address, or distributing, in the virtual subnet based on the routing protocol, a local CE host route corresponding to the IP address.

In some embodiments of the present disclosure, the processor 1101 is further configured to:

when it is determined that the source MAC address is not a virtual MAC address and the source MAC address is different from any one of MAC addresses recorded in a blacklist, perform at least one of the following operations: saving a local CE host routing table entry corresponding to the source IP address, or distributing, in the virtual subnet based on the routing protocol, a local CE host route corresponding to the IP address;

and/or when it is determined that the source MAC address is not a virtual MAC address and the source MAC address is the same as one of MAC addresses recorded in the blacklist, skip performing at least one of the following operations: saving a local CE host routing table entry corresponding to the source IP address, or distributing, in the virtual subnet based on the routing protocol, a local CE host route corresponding to the IP address.

In some embodiments of the present disclosure, in an aspect of the determining whether a source media access control MAC address carried in the packet is a virtual MAC address, the processor 1101 is specifically configured to: determine that the source MAC address is a virtual MAC address if the source MAC address carried in the packet is the same as a virtual MAC address corresponding to the provider edge device; and determine that the source MAC address is not a virtual MAC address if the source MAC address is different from the virtual MAC address corresponding to the provider edge device.

In some embodiments of the present disclosure, in an aspect of the determining whether a source media access control MAC address carried in the packet is a virtual MAC address, the processor 1101 is specifically configured to: query a virtual MAC address corresponding to at least one second provider edge device, and determine that the source MAC address is a virtual MAC address if the source MAC address carried in the packet is the same as a queried virtual MAC address corresponding to one of the at least one second provider edge device; determine that the source MAC address is not a virtual MAC address if the source MAC address carried in the packet is different from the queried virtual MAC address corresponding to any one of the at least one second provider edge device.

In some embodiments of the present disclosure, a virtual MAC address corresponding to a PE device (for example, the provider edge device 1100 or the second PE device) may specifically be a virtual MAC address corresponding to a virtual router that is associated with the PE device.

It can be understood that, a local CE host routing table entry saved by the PE device points to a CE host in a site in which the PE device is located. A local CE host route distributed by the PE device points to a CE host in a site in which the PE device is located. In the embodiment of the present disclosure, the local CE host routing table entry saved by the PE device may include an IP address of a CE host and a next hop address. In the embodiment of the present disclosure, the local CE host route distributed by the PE device may include an IP address of a CE host and a next hop address.

It may be understood that function of functional modules of the provider edge device 1100 in the embodiment may be specifically implemented according to the methods in the above-mentioned method embodiments, and the specific implementation process thereof may refer to the relevant description of the above-mentioned method embodiments and will not be described in detail herein.

It can be seen from the above, in the technical solution of the embodiment of the present disclosure, after receiving a packet for address resolution, the PE device 1100 first determines whether a source MAC address carried in the packet for address resolution is a virtual MAC address; and when it is determined that the source MAC address is a virtual MAC address, a local CE host routing table entry corresponding to a source IP address carried in the above-mentioned ARP packet is not saved, and/or a local CE host route corresponding to the above-mentioned IP address is not distributed in the above-mentioned virtual subnet based on a routing protocol of a layer 3 VPN, and the virtual subnet site in which the PE device 1100 is located further includes at least one second PE device. A research finds that the packet, whose source MAC address is a virtual MAC, for address resolution is generally sent by another PE device that is in the virtual subnet site in which the first PE is located and that serves as an address resolution proxy. Therefore, the PE device 1100 identifies and determines whether the source MAC address carried in the received packet for address resolution is a virtual MAC address, so as to identify a case whether the packet for address resolution is sent by the another PE device that is in the virtual subnet site in which the first PE device is located and that serves as an address resolution proxy, and corresponding to such case (that is, when it is determined that the above-mentioned source MAC address is a virtual MAC address), the PE device 1100 does not save a local CE host routing table entry corresponding to a source IP address carried in the above-mentioned packet for address resolution, and/or the PE device 1100 does not distribute a local CE host route corresponding to the above-mentioned IP address in the virtual subnet based on a routing protocol of a layer 3 VPN. In this way, it is helpful to eliminate that a PE device stores and/or distributes an incorrect CE host route fundamentally, so as to help avoid forming a CE host routing loop to a greatest extent in a scenario in which multiple PE devices exist in some sites of the virtual subnet, thereby improving efficiency of data packet transmission between CE hosts and reducing waste of network resources.

Figure 12:
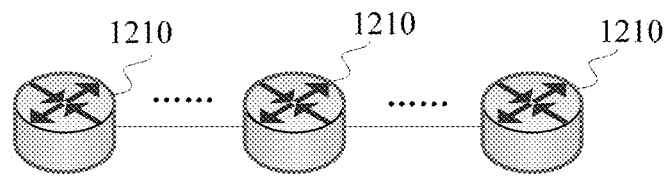
FIG. 12 is a schematic diagram of a communications system provided in an embodiment of the present disclosure.

Referring to FIG. 12, an embodiment of the present disclosure further provides a communications system, which may include:

multiple provider edge devices 1210, where at least one of the multiple provider edge devices 1210 may be the provider edge device 900 or the provider edge device 1100 or the provider edge device 1100.

The embodiment of the present disclosure further provides a computer storage medium, where the computer storage medium may store a program. The program includes, when being executed, a part of or all steps of the method for processing the host route in the virtual subnet disclosed in the above-mentioned method embodiments.

It should be noted that, for simple description, the foregoing method embodiments are expressed as a series of action combinations, but those skilled in the art should be aware that the present disclosure is not limited to the described action sequence, because according to the present disclosure, some steps may be implemented in other sequences or simultaneously. In addition, those skilled in the art should also be aware that the embodiments described in the description all belong to preferred embodiments and the involved actions and modules are not necessarily required by the present disclosure.

In the above-mentioned embodiments, descriptions of the embodiments have different emphases, and if no detailed description is given to part of a certain embodiment, reference may be made to relevant descriptions of other embodiments.

In the several embodiments provided in the application, it shall be understood that the disclosed devices may be realized in other modes. For example, the embodiments of the above-described devices are only exemplary, for example, the division of the units is only a logic function division, other division modes may be adopted in practice, for example, multiple units or components may be combined or integrated in another system, or some characteristics may be omitted or be not executed. From another point of view, the displayed or discussed mutual coupling or direct coupling or communication connection may be indirect coupling or communication connection of devices or units through some interfaces, and may also be in electrical or other forms.

The units illustrated as separate components may be or may not be physically separated, and the components displayed as units may be or may not be physical units, that is to say, the components may be positioned at one place or may also be distributed on multiple network units. The objective of the solution of the embodiments may be fulfilled by selecting part of or all of the units according to actual needs.

In addition, in various embodiments of the present disclosure, the functional units may be integrated in one processing unit, or the functional units may separately and physically exist, or two or more units may be integrated in one unit. The above integrated units may be implemented in the form of hardware or may be implemented in the form of software functional unit.

When the integrated unit is implemented in the form of a software functional unit and is sold or used as an independent product, the integrated unit may be stored in a computer readable storage medium. Based on such an understanding, the technical solution of the present disclosure substantially, or the part of the present disclosure making contribution to the prior art, or all of or a part of the technical solution may be embodied in the form of a software product, and the computer software product is stored in a storage medium, which includes a plurality of instructions enabling computer equipment (which may be a personal computer, a server, network equipment or the like, and specifically may be a processor in a computer device) to execute all of or part of the steps in the methods of the embodiments of the present disclosure. The aforementioned storage medium may include: various media capable of storing program codes, such as a USB disk, a magnetic disk, a random access memory (RAM), a read-only memory (ROM), or a mobile hard disk or an optical disk or the like.

The above-mentioned embodiments are merely used for describing the solutions of the present disclosure, rather than restricting thereof. Although the present disclosure is described in detail with reference to the above embodiments, the persons of ordinary skills in the art should understand that the technical solutions described in the embodiments described above may stilled be modified, or equivalently replaced with parts of the technical features thereof; and such modifications and replacements will not make the nature of the corresponding technical solutions depart from the spirit and scope of the technical solution of the embodiments of the present disclosure.

What is claimed is:

1. A method for processing, by a first provider edge device, a host route in a virtual subnet, comprising:
   receiving, by the first provider edge device, a packet for address resolution;
   determining, by the first provider edge device, whether a source media access control (MAC) address carried in the packet is a virtual MAC address; and
   performing, by the first provider edge device when it is determined that the source MAC address is not a virtual MAC address, at least one operation from the group consisting of:
      saving a local CE host routing table entry corresponding to the source IP address, and
      distributing, in the virtual subnet based on the routing protocol, a local CE host route corresponding to the IP address.

2. The method according to claim 1, wherein the method further comprises:
   when it is determined that the source MAC address is not a virtual MAC address and the source MAC address is different from any one of MAC addresses recorded in a whitelist, skipping performing at least one of the following operations: saving a local CE host routing table entry corresponding to the source IP address, or distributing, in the virtual subnet based on the routing protocol, a local CE host route corresponding to the IP address; and/or
   when it is determined that the source MAC address is not a virtual MAC address and the source MAC address is the same as one of MAC addresses recorded in the whitelist, performing at least one of the following operations: saving a local CE host routing table entry corresponding to the source IP address, or distributing, in the virtual subnet based on the routing protocol, a local CE host route corresponding to the IP address.

3. The method according to claim 1, wherein the method further comprises:
when it is determined that the source MAC address is not a virtual MAC address and the source MAC address is different from any one of MAC addresses recorded in a blacklist, performing at least one of the following operations: saving a local CE host routing table entry corresponding to the source IP address, or distributing, in the virtual subnet based on the routing protocol, a local CE host route corresponding to the IP address; and/or
when it is determined that the source MAC address is not a virtual MAC address and the source MAC address is the same as one of MAC addresses recorded in the blacklist, skipping performing at least one of the following operations: saving a local CE host routing table entry corresponding to the source IP address, or distributing, in the virtual subnet based on the routing protocol, a local CE host route corresponding to the IP address.

4. The method according to claim 1, wherein the determining whether a source MAC address carried in the packet is a virtual MAC address comprises:
determining that the source MAC address is a virtual MAC address if the source MAC address carried in the packet is the same as a virtual MAC address corresponding to the first provider edge device; and
determining that the source MAC address is not a virtual MAC address if the source MAC address is different from the virtual MAC address corresponding to the first provider edge device.

5. The method according to claim 1, wherein the determining whether a MAC address carried in the packet is a virtual MAC address comprises:
querying a virtual MAC address corresponding to at least one second provider edge device, and determining that the source MAC address is a virtual MAC address if the source MAC address carried in the packet is the same as a queried virtual MAC address corresponding to one of the at least one second provider edge device; and
determining that the source MAC address is not a virtual MAC address if the source MAC address carried in the packet is different from the queried virtual MAC address corresponding to any one of the at least one second provider edge device.

6. The method according to claim 1, wherein the packet is an address resolution protocol (ARP) packet or a neighbor discovery (ND) protocol packet.

7. A provider edge device, comprising:
a receiver, configured to receive a packet for address resolution; and
a processor, configured to carry out a method comprising:
determining whether a source media access control (MAC) address carried in the packet is a virtual MAC address; and;
performing, when it is determined that the source MAC address is not a virtual MAC address, at least one operation from the group consisting of:
saving a local CE host routing table entry corresponding to the source IP address, and
distributing, in the virtual subnet based on the routing protocol, a local CE host route corresponding to the IP address.

8. The provider edge device according to claim 7, wherein the processor is further configured to:
when it is determined that the source MAC address is not a virtual MAC address and the source MAC address is different from any one of MAC addresses recorded in a whitelist, skip performing at least one of the following operations: saving a local CE host routing table entry corresponding to the source IP address, or distributing, in the virtual subnet based on the routing protocol, a local CE host route corresponding to the IP address; and/or
when it is determined that the source MAC address is not a virtual MAC address and the source MAC address is the same as one of MAC addresses recorded in the whitelist, perform at least one of the following operations: saving a local CE host routing table entry corresponding to the source IP address, or distributing, in the virtual subnet based on the routing protocol, a local CE host route corresponding to the IP address.

9. The provider edge device according to claim 7, wherein the processor is further configured to:
when it is determined that the source MAC address is not a virtual MAC address and the source MAC address is different from any one of MAC addresses recorded in a blacklist, perform at least one of the following operations: saving a local CE host routing table entry corresponding to the source IP address, or distributing, in the virtual subnet based on the routing protocol, a local CE host route corresponding to the IP address; and/or
when it is determined that the source MAC address is not a virtual MAC address and the source MAC address is the same as one of MAC addresses recorded in the blacklist, skip performing at least one of the following operations: saving a local CE host routing table entry corresponding to the source IP address, or distributing, in the virtual subnet based on the routing protocol, a local CE host route corresponding to the IP address.

10. The provider edge device according to claim 7, wherein in an aspect of the determining whether a MAC address carried in the packet is a virtual MAC address, the processor is further configured to:
determine that the source MAC address is a virtual MAC address if the source MAC address carried in the packet is the same as a virtual MAC address corresponding to the provider edge device; and
determine that the source MAC address is not a virtual MAC address if the source MAC address is different from the virtual MAC address corresponding to the provider edge device.

11. The provider edge device according to claim 7, wherein in an aspect of the determining whether a MAC address carried in the packet is a virtual MAC address, the processor is further configured to:
query a virtual MAC address corresponding to at least one second provider edge device, and determine that the source MAC address is a virtual MAC address if the source MAC address carried in the packet is the same as a queried virtual MAC address corresponding to one of the at least one second provider edge device; and
determine that the source MAC address is not a virtual MAC address if the source MAC address carried in the packet is different from the queried virtual MAC address corresponding to any one of the at least one second provider edge device.

12. The provider edge device according to claim 7, wherein the packet is an address resolution protocol (ARP) packet or a neighbor discovery (ND) protocol packet.

13. A communications system, comprising:
multiple provider edge devices, wherein at least one of the multiple provider edge devices comprises:
a receiver, configured to receive a packet for address resolution; and
a processor, configured to carry out a method comprising:
determining whether a source media access control (MAC) address carried in the packet is a virtual MAC address; and
performing, when it is determined that the source MAC address is not a virtual MAC address, at least one operation from the group consisting of:
saving a local CE host routing table entry corresponding to the source IP address, and
distributing, in the virtual subnet based on the routing protocol, a local CE host route corresponding to the IP address.

14. The communications system according to claim 13, wherein
the processor is further configured to:
when it is determined that the source MAC address is not a virtual MAC address and the source MAC address is different from any one of MAC addresses recorded in a whitelist, skip performing at least one of the following operations: saving a local CE host routing table entry corresponding to the source IP address, or distributing, in the virtual subnet based on the routing protocol, a local CE host route corresponding to the IP address;
and/or
when it is determined that the source MAC address is not a virtual MAC address and the source MAC address is the same as one of MAC addresses recorded in the whitelist, perform at least one of the following operations: saving a local CE host routing table entry corresponding to the source IP address, or distributing, in the virtual subnet based on the routing protocol, a local CE host route corresponding to the IP address.

15. The communications system according to claim 13, wherein
the processor is further configured to:
when it is determined that the source MAC address is not a virtual MAC address and the source MAC address is different from any one of MAC addresses recorded in a blacklist, perform at least one of the following operations: saving a local CE host routing table entry corresponding to the source IP address, or distributing, in the virtual subnet based on the routing protocol, a local CE host route corresponding to the IP address;
and/or
when it is determined that the source MAC address is not a virtual MAC address and the source MAC address is the same as one of MAC addresses recorded in the blacklist, skip performing at least one of the following operations: saving a local CE host routing table entry corresponding to the source IP address, or distributing, in the virtual subnet based on the routing protocol, a local CE host route corresponding to the IP address.

16. The communications system according to claim 13, wherein
in an aspect of the determining whether a MAC address carried in the packet is a virtual MAC address, the processor is further configured to: determine that the source MAC address is a virtual MAC address if the source MAC address carried in the packet is the same as a virtual MAC address corresponding to the provider edge device; and determine that the source MAC address is not a virtual MAC address if the source MAC address is different from the virtual MAC address corresponding to the provider edge device.

17. The communications system according to claim 13, wherein
in an aspect of the determining whether a MAC address carried in the packet is a virtual MAC address, the processor is further configured to: query a virtual MAC address corresponding to at least one second provider edge device, and determine that the source MAC address is a virtual MAC address if the source MAC address carried in the packet is the same as a queried virtual MAC address corresponding to one of the at least one second provider edge device; and determine that the source MAC address is not a virtual MAC address if the source MAC address carried in the packet is different from the queried virtual MAC address corresponding to any one of the at least one second provider edge device.

* * * * *